(12) United States Patent
Mockry et al.

(10) Patent No.: US 6,460,832 B1
(45) Date of Patent: Oct. 8, 2002

(54) NESTED, EXPANDABLE, LIQUID FILM FILL SHEET BUNDLE FOR EXPEDITED INSTALLATION AS A FILM FILL PACK

(75) Inventors: Eldon F. Mockry, Lenexa, KS (US); Ohler L. Kinney, Jr., Overland Park, KS (US)

(73) Assignee: The Marley Cooling Tower Company, Overland Park, KS (US)

( * ) Notice: Subject to any disclaimer, the term of this patent is extended or adjusted under 35 U.S.C. 154(b) by 0 days.

(21) Appl. No.: 09/637,056

(22) Filed: Aug. 11, 2000

(51) Int. Cl.$^7$ .................................. B01F 3/04
(52) U.S. Cl. .................. 261/112.1; 261/112.2; 261/DIG. 11
(58) Field of Search ............ 261/112.1, 112.2, 261/DIG. 11, DIG. 72; 428/179

(56) References Cited

U.S. PATENT DOCUMENTS

| | | | |
|---|---|---|---|
| 4,361,426 A | * 11/1982 | Carter et al. ............. | 261/112.2 |
| 4,548,766 A | 10/1985 | Kinney, Jr. et al. | |
| 4,801,410 A | 1/1989 | Kinney, Jr. et al. | |
| 4,826,636 A | 5/1989 | Kinney, Jr. et al. | |
| 5,147,583 A | 9/1992 | Bugler, III et al. | |
| 5,474,832 A | * 12/1995 | Massey ................... | 261/112.2 |
| 6,206,350 B1 | * 3/2001 | Harrison et al. ......... | 261/112.2 |
| 6,260,830 B1 | 7/2001 | Harrison et al. | |

* cited by examiner

*Primary Examiner*—C. Scott Bushey
(74) *Attorney, Agent, or Firm*—Baker & Hostetler

(57) ABSTRACT

A nested, expandable, compact, liquid film fill sheet bundle is provided which facilitates shipment and then installation of the sheets to present a film fill pack for use in liquid cooling apparatus. The bundle includes a plurality of shingled, nested film fill sheets each having repeating, successive, area-increasing surface patterns on opposite faces thereof which complementally nest when the sheets are in bundled, shingled relationship. The sheets which are shingled are offset from the other sheets of the bundle by an amount equal to the width of each of the successive, repeating, surface area-increasing patterns in the sheets. The nested bundle is raised as a unit to the site of the fill pack where it is installed on support structure for the fill pack. The film fill sheets are then successively and sequentially expanded while carried by the fill pack support structure by shifting either one sheet with respect to the next adjacent sheet, or by shifting adjacent sheets relative to one another. The film fill sheets are moved relatively through a displacement to unshingle and thereby unnest the fill sheets. The sheets which are shifted to unshingle and unnest the bundle are each provided with a slot or slit therein which clears the support structure for the fill pack during shifting of a respective movable sheet and while the bundle remains supported by the fill support structure.

23 Claims, 12 Drawing Sheets

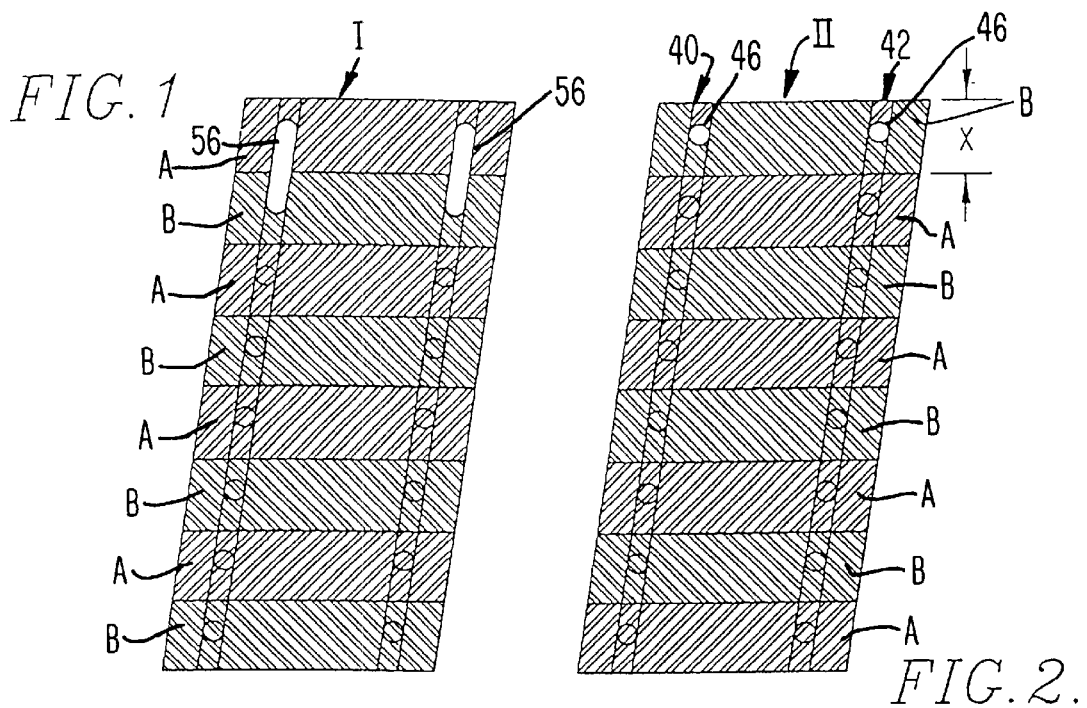
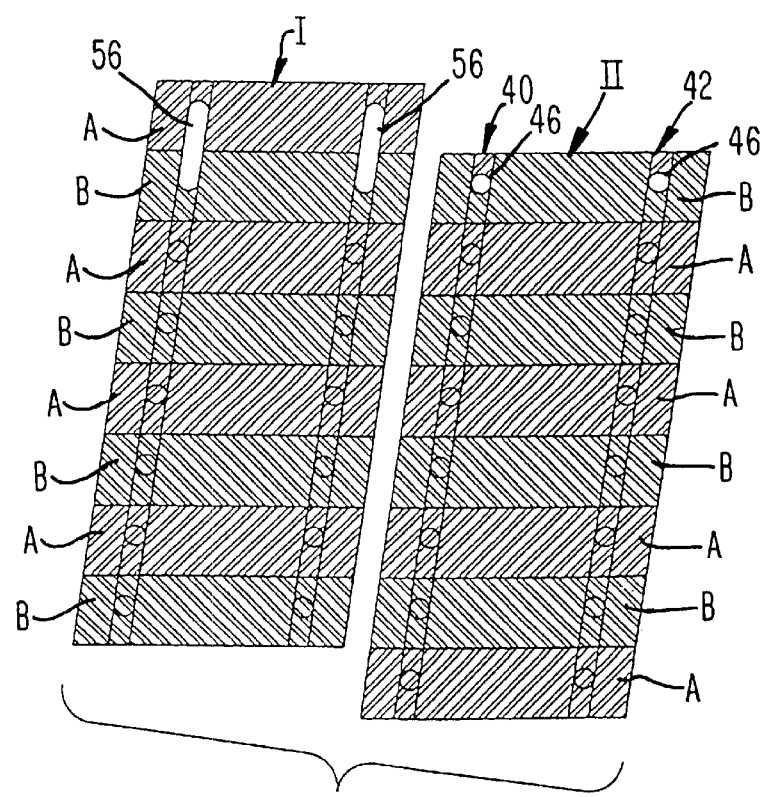

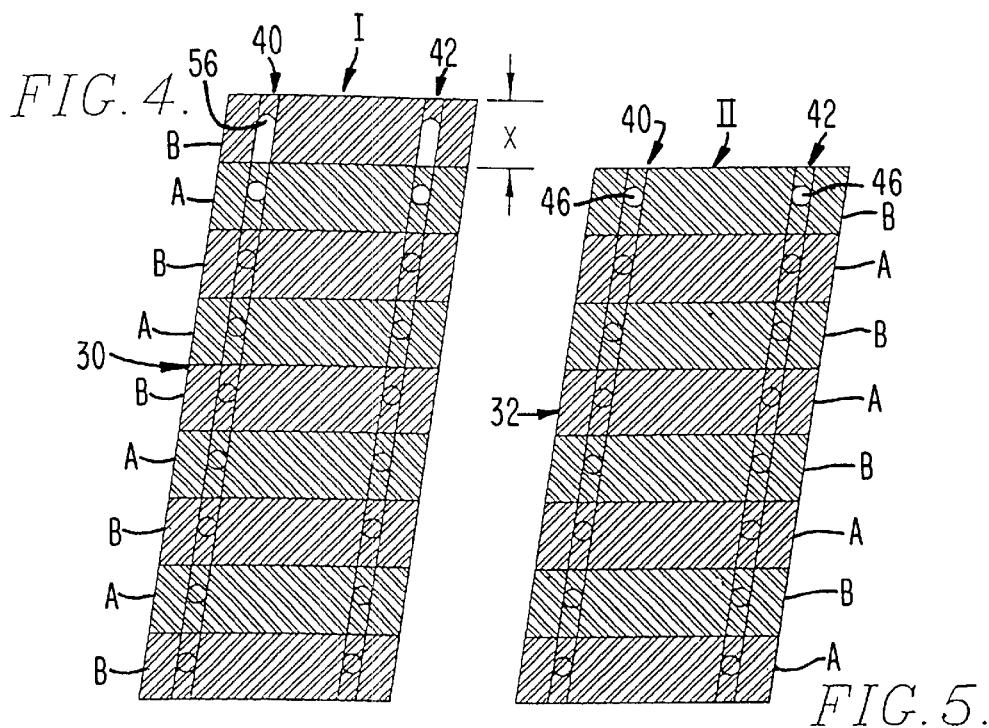
FIG. 4. FIG. 5.
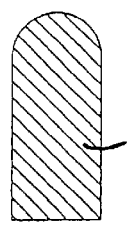
FIG. 32.
FIG. 33.
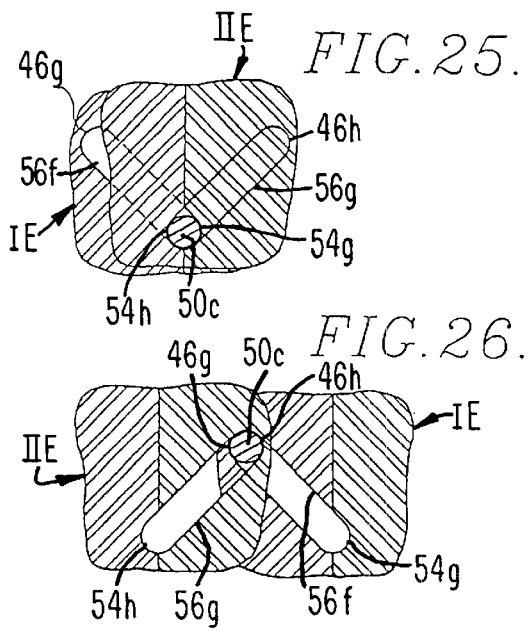
FIG. 25.
FIG. 26.
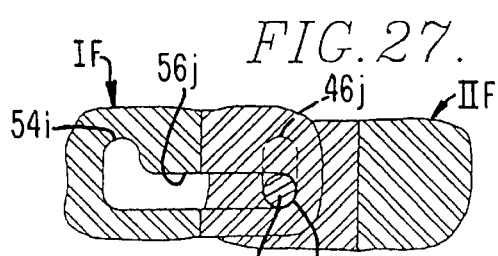
FIG. 27.
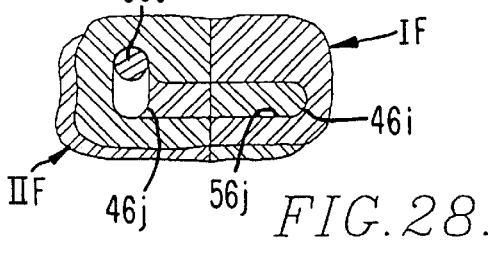
FIG. 28.

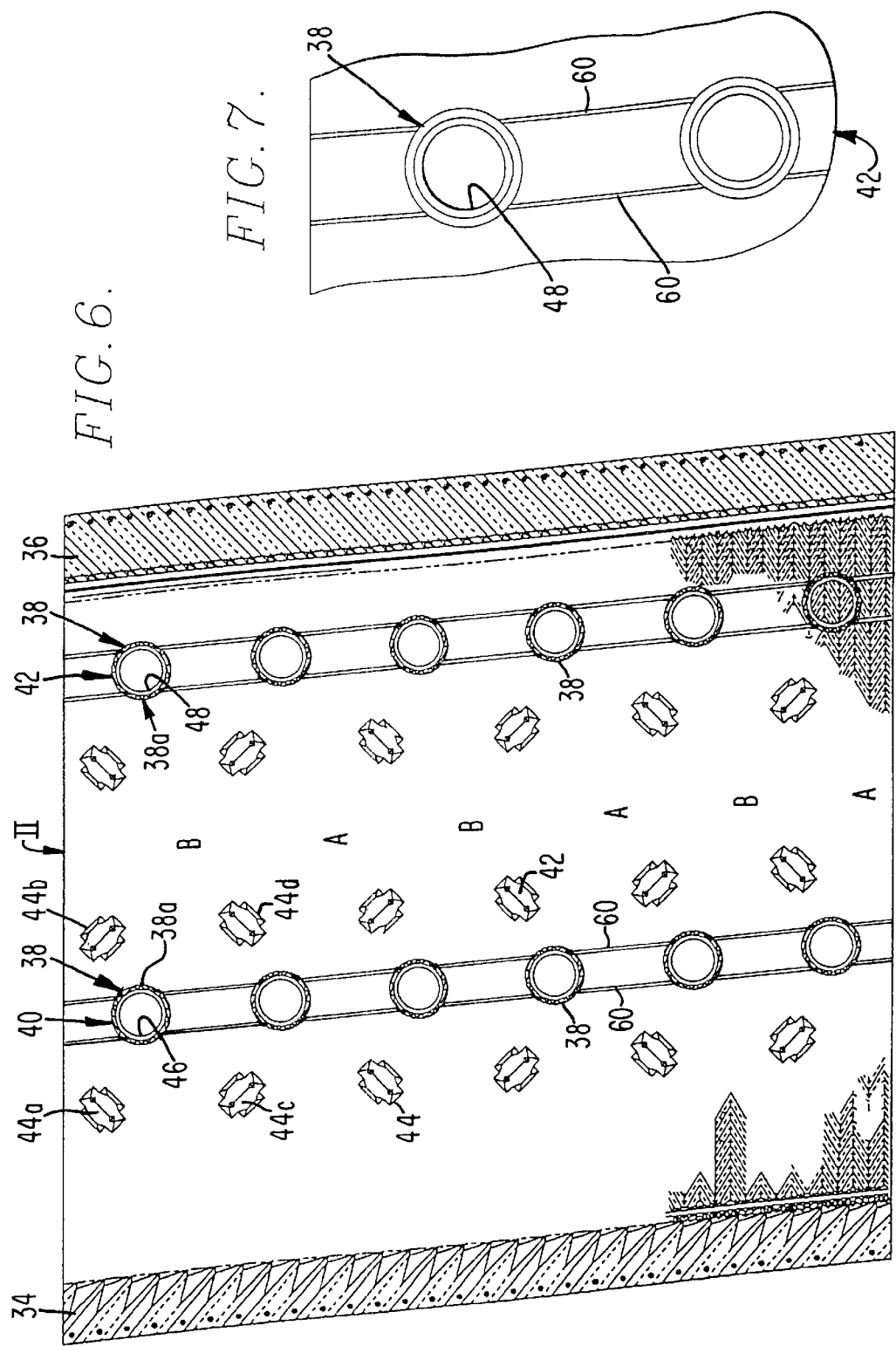

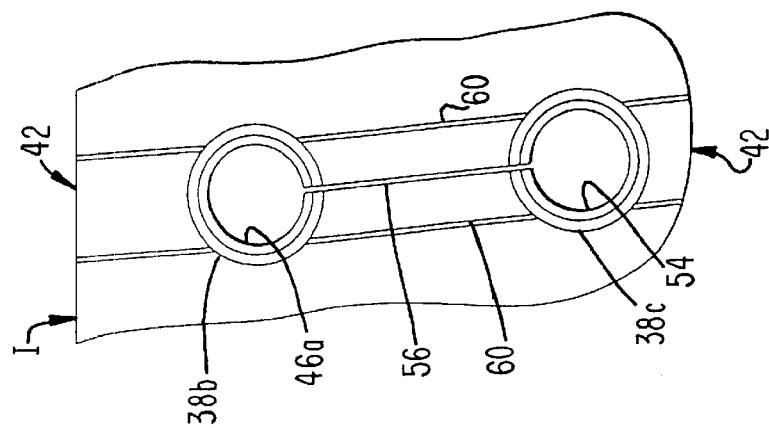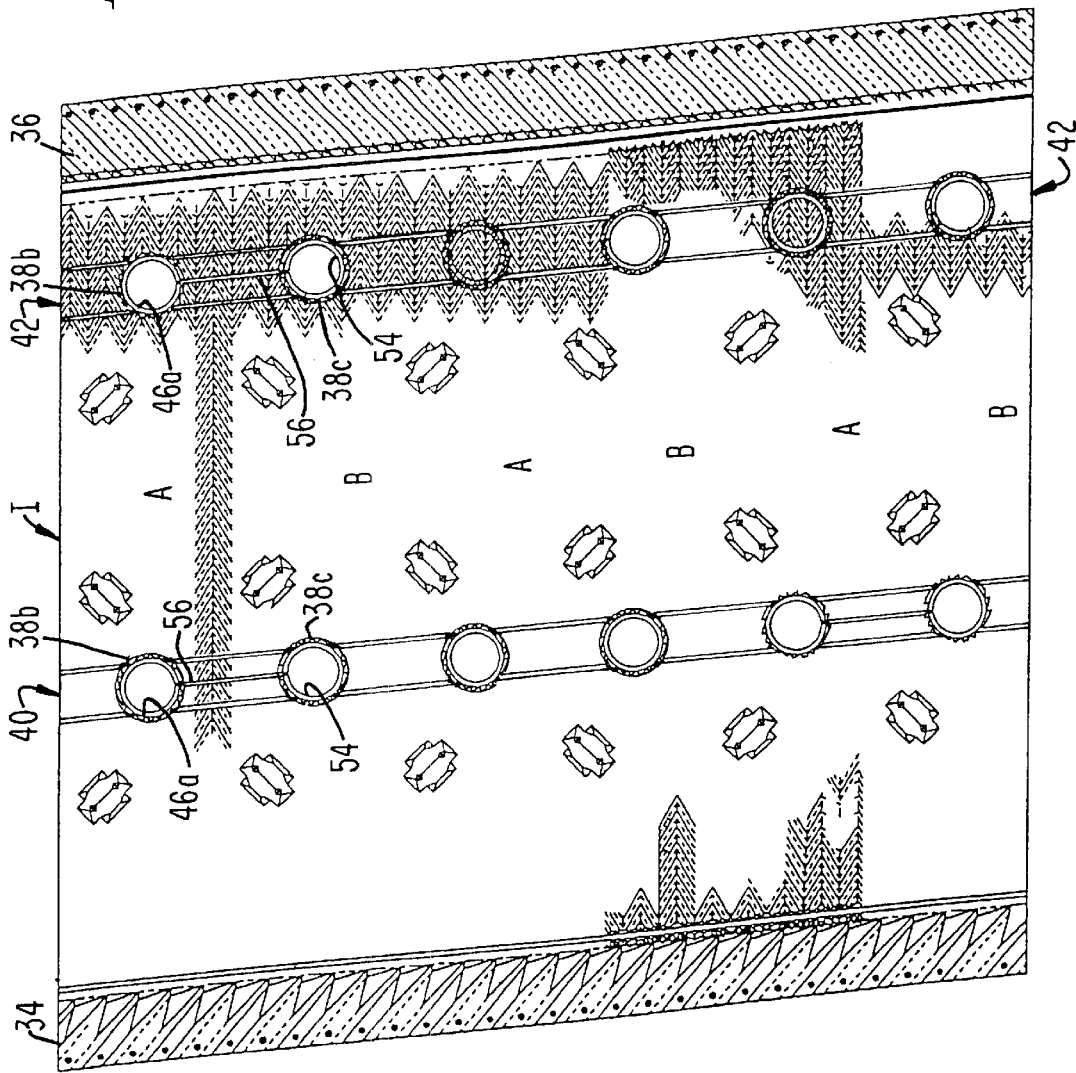

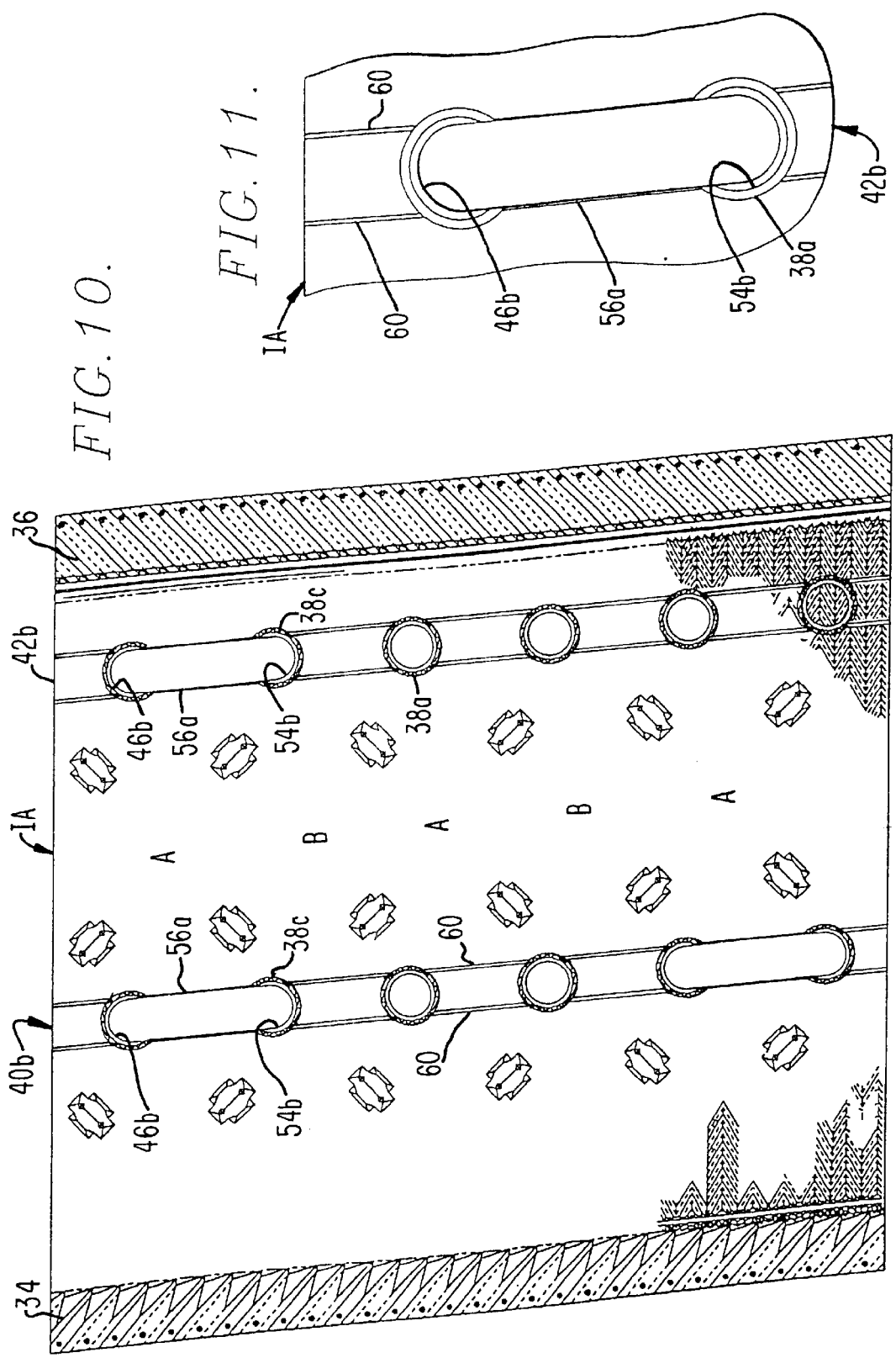

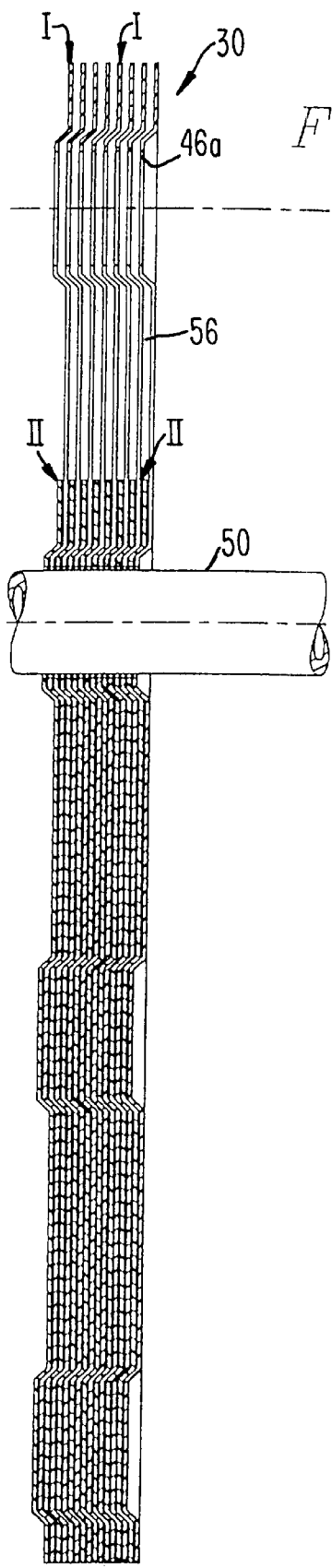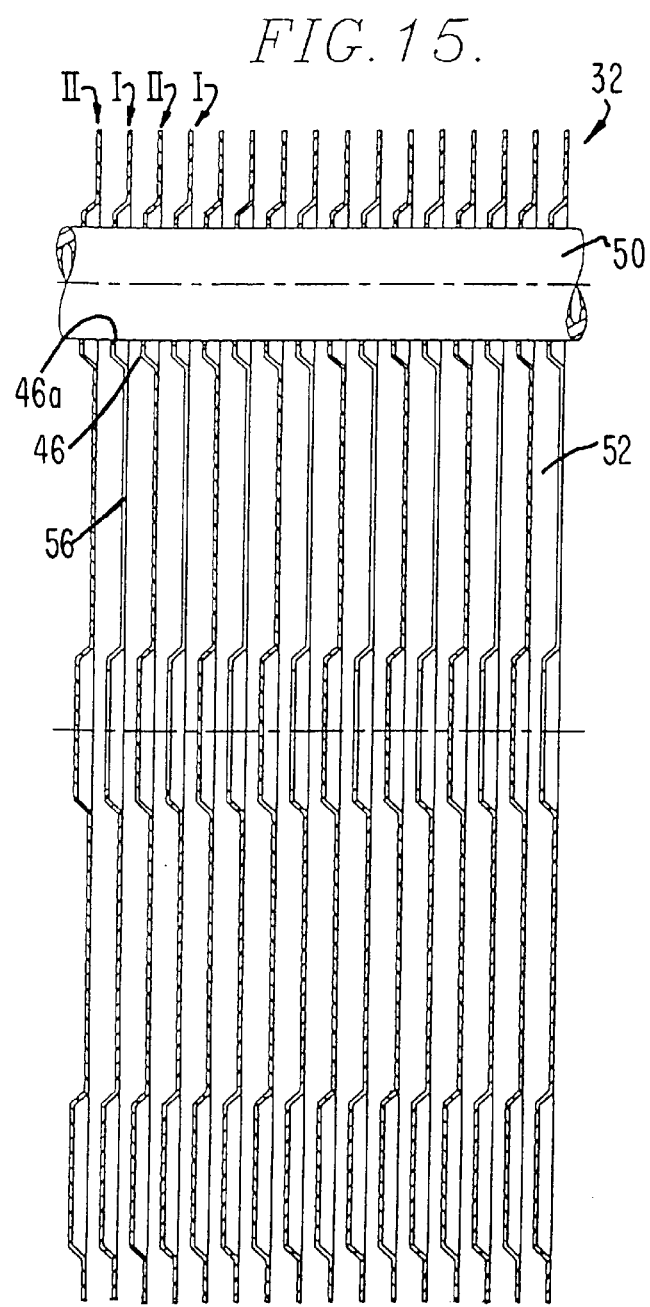
FIG. 14.
FIG. 15.

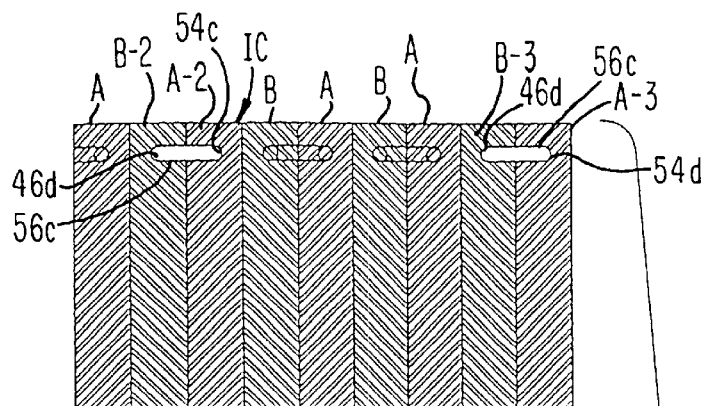
FIG. 16.
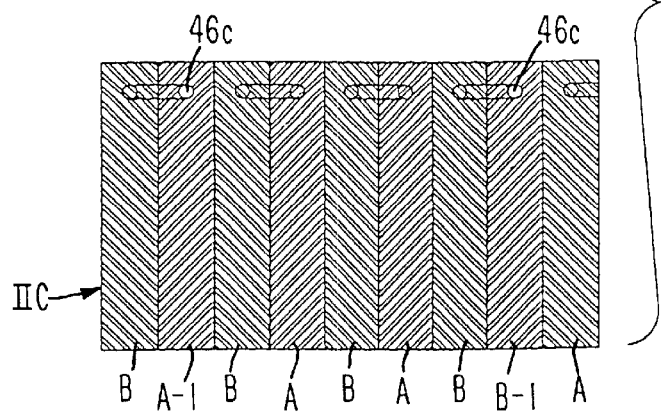
FIG. 17.
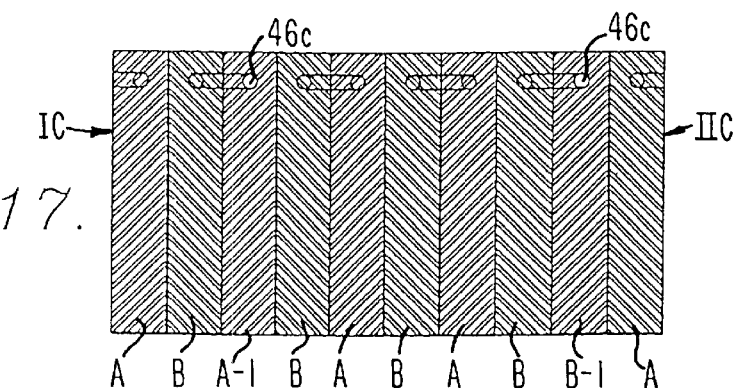
FIG. 18.
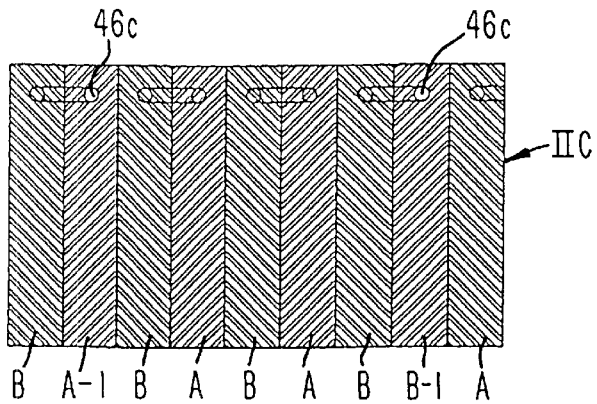

NESTED, EXPANDABLE, LIQUID FILM FILL SHEET BUNDLE FOR EXPEDITED INSTALLATION AS A FILM FILL PACK

FIELD OF THE INVENTION

This invention relates to film fill sheets making up fill packs used in liquid cooling apparatus, and especially to film fill sheets each having repeating, successive surface area-increasing patterns. The film fill sheets are each configured to be arranged in a shingled bundle in nested relationship for shipping. The shingled bundle may be mounted as a unit on the support structure for the fill pack in the cooling tower apparatus. Thereafter, the bundle may be expeditiously expanded in place by effecting relative movement between the sheets while supported by the support structure to unshingle the bundle and thereby unnest the surface area-increasing patterns of adjacent sheets. The expanded, unshingled bundle thus forms all or a part of the fill pack in the liquid cooling apparatus.

DESCRIPTION OF THE PRIOR ART

Film type fill media in the form of a fill pack has been used for many years in liquid cooling apparatus such as water cooling towers. Film type media generally takes the form of a large number of individual film fill sheets configured and oriented to present both a liquid path and a fluid cooling medium path therebetween with each sheet of the pack providing a relatively large surface area over which the hot liquid being cooled spreads into a relatively thin film, on opposite faces of each of the sheets. A coolant fluid such as cool ambient air is then drawn over the large surface area of the liquid film causing the liquid to be cooled by direct contact of the coolant fluid with the hot liquid. In the case of hot water, the water is cooled evaporatively. The individual fill sheets are generally fabricated of a flexible material such as a synthetic resin and are therefor not capable of standing by themselves when formed into a pack. Two methods of supporting film fill type media are commonly used to install film fill packs in cooling towers.

One method of providing support is to glue a plurality of film fill sheets into requisite packs and to support the fill packs by stacking them on underlying structural supports. By gluing the film fill sheets together at discrete contact points, a lattice type structure is developed which thereby contributes substantial strength to the overall pack. Gluing of the sheets is especially useful in fabrication of fill packs made up of cross-corrugated film fill media. An exemplary cross-corrugated fill pack is disclosed by Munters in U.S. Pat. No. 3,415,502 (Liquid and Gas Contact Body). A major disadvantage of the gluing method is the fact that cross-corrugated film fill packs inherently are dominated by air voids. Pack gluing usually takes place in a factory. This makes for inefficient shipping as most of the pack is air and the packs must be handled multiple times during shipment and installation.

Mobile pack-making machines have been used at the site of very large towers to overcome the shipping disadvantage. Nested film fill sheets with little or no air voids and glue are shipped to the location of the mobile pack-making machine near the tower under construction where the packs are made. Pack fabricating equipment, however, is very expensive, requires set-up at and then removal from the point of usage, and necessitates the provision of weather protection structure for the equipment.

Mobile pack making is expensive not only because of the capital costs incurred, but also because it is necessary to hire a crew, train that crew, prepare a staging area, and to purchase insurance, obtain permits, etc. which makes it economical for only very large towers and then only for certain favorable ambient conditions. Total handling and installation costs are thus about the same as for factory made packs.

A second common method of installing fill in cooling towers is to hang a plurality of film fill sheets making up a pack from support tubes carried by frame work of the tower. Support tube openings are provided near the top of each of the fill pack film sheets. The sheets are then suspended one at a time from the support tubes placing the sheets in tension except for the very top portion of each sheet. Exemplary film fill sheets used to fabricate fill packs hung from support tubes in water cooling towers are disclosed by Kinney, Jr. et al. in U.S. Pat. Nos. 4,548,766 (Vacuum Formable Water Cooling Tower Film Fill Sheet with Integral Spacers), 4,826,636 (Multi-Level Film Fill Industrial Cross Flow Cooling Tower), and 4,801,410 (Plastic Fill Sheet for Water Cooling Tower with Air Guiding Spacers) and by Bugler et al. in U.S. Pat. No. 5,147,583 (Non-Clogging Film Fill Assembly for Counterflow Water Cooling Tower).

Adjacent film fill sheets must contact one another to keep the sheets properly spaced and to minimize aerodynamically excited vibrations. In cross-corrugated fills as illustrated and described in the '502 patent, and non-clogging film fill as shown and described in the '583 patent, sheet contact is necessary to force the air to repetitively split and regroup, thus mixing the air as it traverses through the fill pack. Additionally, the integral louvers, integral eliminators, and air guiding spacers such as shown and described in the '410 patent form cellular or honeycomb structures, which necessarily require contact by adjacent sheets.

Two film fill surface configurations are generally employed to obtain requisite contact between the cooling fluid medium and the hot liquid within the fill pack. One surface configuration is such that sheets which are nested for shipment may be alternately rotated or flipped over when forming the pack therefrom. Exemplary fill sheets in this respect are found in the '502 and '583 patents. This surface area-increasing geometry has the advantage that all of the sheets are the same.

Another method is to simply make two different complemental sets of film fill sheets which are alternated in the installation, i.e., A, B, A, B, etc. An exemplary fill using film fill sheets of this technique is discussed and illustrated in U.S. Pat. No. 9,320,073.

Both of these methods require extensive handling of the individual film fill sheets to orient the sheets properly to form the desired pack. For shipping purposes, in order to avoid the problem of shipping film fill packs in assembled condition, which is largely air, the fill pack is assembled on site. In the case of hanging fill packs, one sheet at a time must be placed on the support tubes. This means that the installers must remove individual film fill sheets which have been shipped nested, one at a time from the packing crate. These film fill sheets are then elevated to the point of installation where they are sequentially placed over support tubes in proper orientation one with respect to another. Obviously, in view of the flexibility of the film material and the overall area of each of the film fill sheets, wind velocities are a major factor in the construction process. In fact, film fill sheet installation must be halted when the wind velocity exceeds a value determined and established as a standard by experience.

To save hanging fill pack erection time at the tower site, there has been an effort to glue the film fill sheets into packs at ground level prior to installation on the tube supports. This is expensive, as previously pointed out, and can only be justified on short construction schedules.

SUMMARY OF THE INVENTION

Therefore, what is needed and has not been previously available is a multiple sheet film fill that (a) ships with nested sheets to the assembly or construction site to minimize shipping costs by avoiding shipping of air, (b) minimizes handling of individual sheets during the fill installation in the tower, and (c) avoids the expense of gluing of the sheets one to another on site.

In particular, this unfulfilled need is now satisfied by the provision of a bundle made up of a number of liquid film fill sheets in which every other sheet is shingled in order to permit the sheets to be nested for shipping. Each of the film fill sheets has area-increasing surface patterns on opposite faces thereof. The surface patterns of the film fill sheets are configured for complemental nesting of adjacent overlying sheets when adjacent sheets are offset relative to the other sheets to present the shingled fill sheet bundle. The shingled bundles may each be raised as a unit to fill support elevation. Each bundle of film fill sheets is then inserted on support structure such as support tubes. Individual film fill sheets of each bundle may be sequentially separated in place, one from another, starting at one end of the bundle to expand the bundle and unnest the sheets while the bundle is supported by the fill support structure. The expanded bundle thus forms a part or all of the fill pack.

In a preferred embodiment of the invention, all of the sheets of the shingled bundle have primary openings which are aligned for receipt of the supporting structure for the fill pack. The sheets that are offset to present the shingled bundle each have secondary openings aligned with the primary openings of the remaining sheets of the bundle.

The shingled bundle of film fill sheets is adapted to first be mounted on the support structure therefor in disposition with the support structure extending through the primary openings of the unshingled sheets of the bundle, and through the secondary openings of the shingled sheets. Each of the sheets provided with secondary openings has slots therein extending from respective secondary openings to the primary openings in corresponding sheets.

Expansion of the bundle of film fill sheets is accomplished by the simple expedient of sequentially unshingling the shingled sheets as the slots in those sheets clear the supporting structure. The slots in the offset sheets permit these sheets to be individually shifted as respective slots clear the support tubes to unnest adjacent sheets, thus allowing all of the sheets to be moved into aligned, unnested relationship, presenting the desired section of the final fill pack. In view of the fact that a relatively large number of film fill sheets may be placed in overlying, shingled, nested relationship defining a bundle, it is apparent that only a limited number of the individual bundles must be raised from ground level to fill elevation in order to permit fabrication of a completed fill pack within a defined area of the h cooling apparatus or tower.

In another embodiment of the invention, alternate sheets of the nested, shingled bundle have oppositely inclined slots which cooperate to present support openings for receiving the fill pack support structure to provide initial support for the nested, shingled bundle. The slots also function to clear the support structure as adjacent sheets are shifted relative to each other and with respect to the support structure through a displacement equal to one-half of the width of the repetitive surface area-increasing patterns and thus into unnested, fill-defining relationship as the support structure is then received in aligned openings at opposite ends of adjacent slots.

In a further embodiment of the invention, all sheets of a bundle have the described openings for receiving the fill pack support structure when the bundle is initially mounted on that support structure, but in this instance, every other sheet has an elongated, generally horizontal, L-shaped slot, while alternate other sheets have elongated slots, transverse to the L-slots. Expansion of the shingled bundle is carried out by successive shifting of the sheets with the L-shaped slots therein with respect to the sheets having the transverse slots and relative to the supporting structure. The L-shaped slots clear the support structure as the sheets with the L-slots therein are shifted in a direction along the length of the long leg of the L. The sheet with the L-slot that is shifted, as well as the next adjacent sheet with a transverse slot, then shift together to bring the support structure into the short leg-defining opening of the L-slot of one sheet and toward an opposite end of the transverse slot in the other proximal sheet to lock the last shifted sheets to the support structure with adjacent surface area-increasing patterns in unnested relationship.

In a still further embodiment of the invention, every other sheet of the shingled bundle is offset from an adjacent sheet in two directions. In this instance, the surface area-increasing patterns of the individual sheets are in checkerboard relative disposition, in which the patterns in adjacent sheets of respective rows nest when the offset sheets of the bundle are displaced from the other adjacent sheets in two directions, i.e., both laterally and in an upright direction when the bundle is mounted on the support structure for the fill assembly. Each of the offset sheets of the shingled bundle has an inclined slot which extends from the aligned openings of the shingled bundle which receive the support tubes for the fill when a bundle is first mounted on the support tubes at fill elevation, and which clear the support tubes as respective offset sheets are shifted both laterally and in a generally upright path to effect successive expansion of the bundle and unnesting of the sheets.

The film fill sheets are preferably of relatively thin, flexible material and the slots which interconnect the primary and second openings of each of the shingled sheets of the nested bundle thereof comprise relatively narrow slits which permit the support structure for the pack to pass therethrough as the film material flexes during unshingling of the initially shingled sheets.

The film fill sheets preferably each have repeating area-increasing surface patterns on opposite faces thereof. In an illustrative case where the patterns are A-B, A-B, etc., pattern A of each sheet is configured to nest with pattern A of another sheet. The same is true with respect to pattern B, etc. The effective dimension of each of the different patterns in the direction of A-B, A-B, etc., is therefore preferably the same. When the film fill sheets are nested, pattern A, for example, is at the top, or to one side of a sheet, while pattern B is at the top or to that one side of the next-adjacent film fill sheet of the nested bundle. Therefore, the extent of offset of every other film fill sheet in the shingled bundle thereof is equal to the width of respective surface patterns, with the A patterns of each sheet being nestable in a corresponding A pattern of adjacent sheets. The same is true as to B patterns.

The invention, however, is not restricted to A-B surface area-increasing patterns as described. The patterns could be A-B-C, etc. The only requirement is that the patterns of adjacent sheets nest, and the bundle of nested sheets may be successively and sequentially unnested while carried by support structure therefor to form the fill pack or fill pack section. Similarly, the fill patterns may present a checkerboard arrangement as described, in which case adjacent nested sheets are offset from one another in two directions.

The nested, expandable, liquid film fill sheet bundle hereof has utility in various applications, including crossflow and counterflow water cooling towers, or evaporative heat transfer apparatus using film fill such as waste heat air saturators, evaporative condensers with fill, and fluid coolers with fill.

BRIEF DESCRIPTION OF THE DRAWINGS

FIG. 1 is a schematic representation of a film fill sheet I forming a part of a nested bundle of sheets, and having repetitive area-increasing surface patterns, shown for example as being A-B, A-B, etc., with illustrative pattern A being at the top thereof, and provided with elongated slots (or slits) in the upper part thereof for receipt of supporting structure for a fill pack;

FIG. 2 is a schematic representation of the next adjacent film fill sheet II forming a part of a nested bundle of sheets, and having repetitive area-increasing surface patterns, shown for example as being B-A, B-A, etc., with illustrative pattern B being at the top thereof, and provided with openings in the upper part thereof that align with the slots or slits of film fill sheet I for receipt of the supporting structure for a fill pack, with the effective height of each surface pattern being represented by the distance X;

FIG. 3 is a schematic representation illustrating the orientation of sheets I and II in order to permit nesting thereof in a bundle of sheets positioned as I-II, I-II, I-II, etc.;

FIG. 4 is a schematic representation of sheets I and II in overlying, nested, shingled relationship with sheet II being illustrated as overlying sheet I;

FIG. 5 is a schematic representation of sheets I and II after unshingling thereof with sheet II again shown as being in overlying relationship to sheet I;

FIG. 6 is a side view of sheet II schematically illustrated in FIG. 2 and constructed substantially in accordance with the film fill sheet of U.S. Pat. No. 4,548,766;

FIG. 7 is a fragmentary, enlarged side view of the upper right corner portion of the film fill sheet depicted in FIG. 6;

FIG. 8 is a side view of sheet I schematically illustrated in FIG. 1 and constructed substantially in accordance with the film fill sheet of U.S. Pat. No. 4,548,766;

FIG. 9 is a fragmentary, enlarged side view of the upper right corner portion of the film fill sheet depicted in FIG. 8;

FIG. 10 is a side view of a film fill sheet IA which is an alternate embodiment of sheet I as shown in FIG. 8;

FIG. 11 is a fragmentary, enlarged side view of the upper right corner portion of the film fill sheet IA depicted in FIG. 10;

FIG. 14 is a fragmentary, enlarged, essentially schematic, vertical cross-sectional view through a bundle supported on a tube and in which the film fill sheets are nested and every other film fill sheet is shingled with respect to the remaining film fill sheets;

FIG. 15 is a fragmentary, enlarged, essentially schematic, vertical cross-sectional view through a fill pack section in which the shingled film fill sheets of the nested film fill sheet bundle have been unshingled to present fluid coolant medium and hot liquid passages between adjacent film fill sheets;

FIG. 16 is a schematic representation of another alternative embodiment of the invention in which the slots or slits in film fill sheet IC are horizontal rather than essentially upright as schematically depicted in the FIG. 1 embodiment of this invention, and in which the slots in film fill sheet IC align with support-receiving openings in film fill sheet IIC;

FIG. 17 is a schematic representation of the alternative embodiment of the invention as shown in FIG. 16, and illustrating film fill sheets IC and IIC in overlying, nested, shingled relationship, with the sheet IIC in overlying relationship to sheet IC;

FIG. 18 is a schematic representation of the alternative embodiment of the invention as shown in FIG. 16, and illustrating film fill sheets IC and IIC in overlying, unnested, unshingled relationship, with the sheet IIC in overlying relationship to sheet IC;

FIG. 25 is a fragmentary, enlarged, schematic representation of fill sheets IE and IIE in which the sheets are nested and shingled;

FIG. 26 is a fragmentary, enlarged, schematic representation of fill sheets IE and IIE in which the sheets are unnested and unshingled;

FIG. 27 is a fragmentary, enlarged, schematic representation of another alternate embodiment of the invention in which sheet IF is provided with a slot or slit is of L-shaped configuration located to align with a respective support structure-receiving opening in adjacent sheet IIF, and with sheet IIF being shown behind of sheet IF;

FIG. 28 is a fragmentary, enlarged, schematic representation of the alternate embodiment of FIG. 27 in which sheets IF and IIF are depicted in their relative positions upon unshingling of sheet IF;

FIG. 32 is an alternate embodiment of fill pack support structure that may be used in place of the tubular pack support member for receiving and carrying each of the film fill sheet bundles; and FIG. 33 is another alternate embodiment of fill pack support structure.

DETAILED DESCRIPTION OF THE PREFERRED EMBODIMENTS

Figure 12:
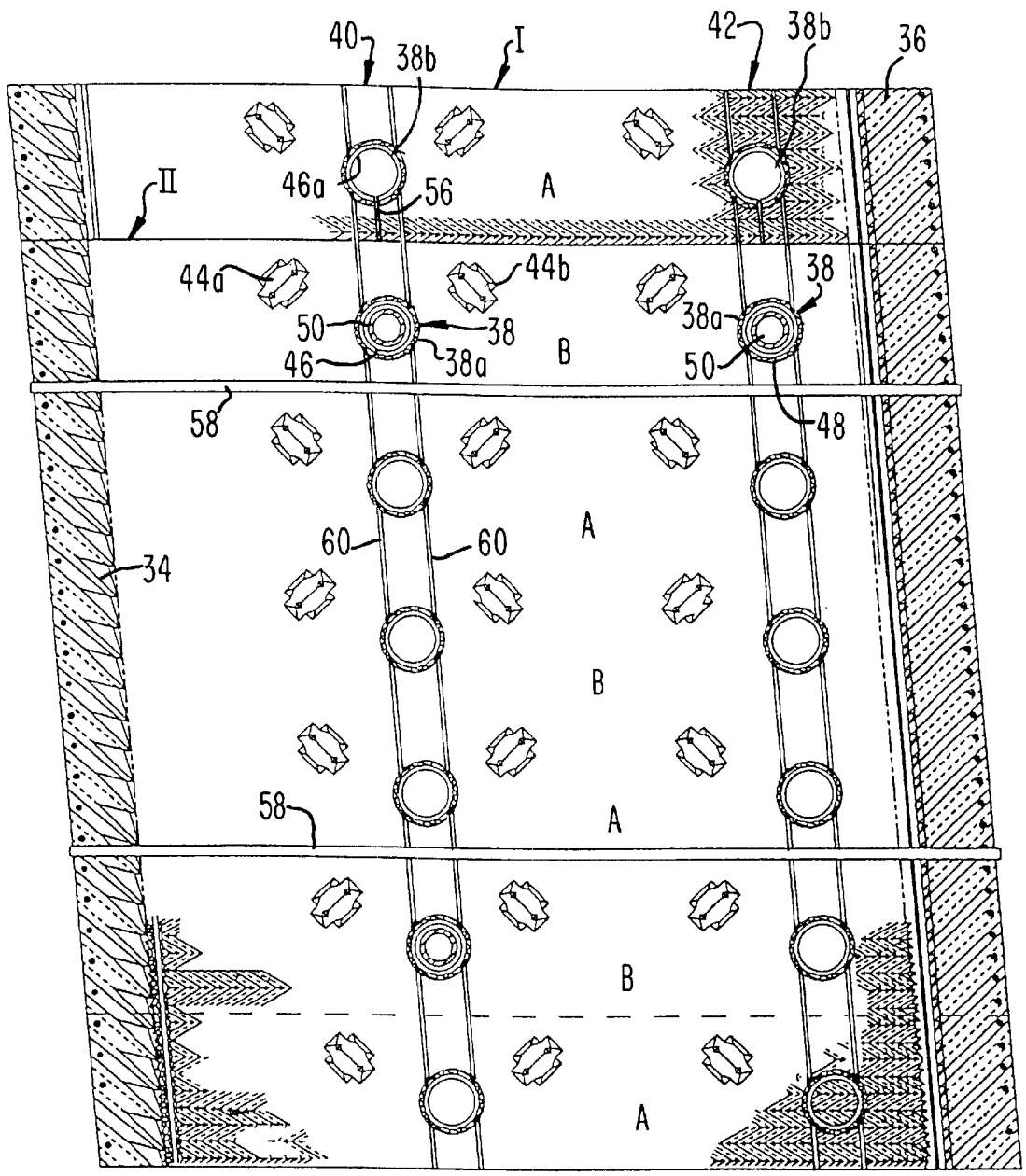
FIG. 12 is a side view of a bundle of sheets I and II as depicted in FIGS. 8 and 6, respectively, with sheets I and II being in shingled relationship as schematically represented in FIG. 4, sheet I being behind sheet II, and shown mounted on support structure in the form of support tubes forming a part of the cooling apparatus.

In accordance with the preferred concepts of the present invention, a series of film fill sheets are provided in the form of a bundle 30 (FIG. 14) which nest for shipping purposes, but may be sequentially separated to form at least a part of a fill pack 32 as shown in FIG. 15. The bundle 30 is made up of alternating film fill sheets I and II. An exemplary film fill sheet II is shown in FIGS. 6 and 7 of the drawings. Sheet II as depicted in FIG. 6 may desirably be constructed in accordance with U.S. Pat. No. 4,548,766, the drawings and description of which are incorporated herein by specific reference thereto. Alternate film fill sheets may be constructed in accordance with the drawings and disclosures of U.S. Pat. Nos. 4,826,636; 4,801,410; and 5,147,583, each of which is incorporated herein by specific reference hereto.

The film fill sheet II is preferably fabricated of a synthetic resin film material, as for example polyvinyl chloride of a thickness generally within the range of about 10 mils to about 40 mils and usually about 15 mils to 20 mils. As is evident from the teaching of the '766 patent, and as illustrated in that patent and in FIG. 6 hereof, the flexible sheet II has integral inlet louver portions 34, eliminator portions 36. Louver portions and eliminator 34 and 36 cooperate when the sheets are positioned in fill-defining relationship to present corresponding louver and eliminator cells as described in the '766 patent. A series of spaced, circular indentations 38 are provided in sheet II in two parallel, generally upright rows 40 and 42 thereof, along with a plurality of spacer knob projections 44. The uppermost indentation 38a of each row 40 and 42 thereof is cut out to form a circular primary opening 46 and 48, respectively. The openings 46 and 48 serve to receive fill pack support structure in the nature of corresponding support tubes 50, as shown in FIGS. 14 and 15. Sheet II also has a surface area-increasing herringbone pattern therein as detailed, for example, in the '766 patent. It is to be observed from FIG. 6 that the projections 44 incline in alternate directions and function to hold adjacent film fill sheets I and II of bundle 30 in spaced relationship presenting cooling fluid medium and hot liquid-receiving passages 52 (FIG. 15) therebetween. To that end, the two uppermost projections 44a and 44b on opposite sides of row 40 face toward one another in one direction, while the projections 44c and 44d immediately therebelow face in the opposite direction so that the projections complementally engage similar projections of next adjacent film fill sheet and thereby maintain the spacing of the film fill sheets. It is to be observed from FIG. 6 that the pairs of projections 44a and 44b alternate in direction as the lower end of the film fill sheet is approached.

The projections 44, and the herringbone surface area-increasing pattern formed in sheet II, for example, as well as the indentations 38 are configured to present repetitive patterns B-A, B-A, B-A along the length of the sheet II in the direction of liquid travel thereover. This repetitive surface pattern B-A, B-A, B-A is illustrated schematically in the depiction of sheet II in FIG. 2 of the drawings, wherein the repetitive surface pattern is also designated by B-A, B-A, B-A. In the schematic representation of FIG. 2, the openings 46 in the rows 40 and 42 of indentations 38 are also identified.

Sheet I is illustrated in FIGS. 8 and 9 of the drawings and is also preferably constructed in accordance with drawings and description of the '766 patent. Accordingly, similar elements in sheet I to those in sheet II are numbered the same. A difference between sheet I and sheet II, is the fact that the repetitive surface area-increasing herringbone pattern sections A-B, A-B, A-B, and spacer projections of sheet I, as shown in the schematic representation of FIG. 1, are offset from the repetitive surface area-increasing patterns B-A, B-A, B-A of sheet II, as depicted schematically in FIG. 2. The extent of offset of the surface patterns between sheets I and II is equal to the dimension of each of the patterns A and B. It is also to be understood in this respect that the patterns A and B in each of the sheets I and 11 are essentially of the same width in the direction of liquid flow.

Although the preferred embodiment of the invention utilizes film sheets I and II having a series of patterns referred to and depicted schematically as A and B, the number of such differing patterns may be varied. The only requirement is that the patterns nest when sheet II for example, is offset from sheet I as shown schematically in FIG. 4 by the width X of a respective surface pattern, and then do not nest but are maintained in proper spaced relationship when the sheets are brought into overlying alignment as shown schematically in FIG. 5.

Another difference between sheets I and II is the fact that in sheet I, the uppermost indicia 38b in each of the rows 40 and 42 is cut out to form circular primary openings 46a for receipt of a respective support tube 50. In addition, the circular indentations 38c in sheet I immediately below corresponding indentations 38b are also cut out to form circular secondary openings 54. The material between the openings 46a and 54 of each row 40 and 42 of sheet 1 is cut to provide a slot in the form of a slit 56 which interconnect a repetitive opening 46a thereabove and the opening 54 therebelow. The elongated slots 56 shown schematically in FIG. 1 are for illustrative purposes only and are not intended to be limited in that the slots may either be in the form of slits as shown in FIG. 8, or as relatively wide slots of a width approximately equal to the diameter of the cutouts in the indentations 38b and 38c of rows 40 and 42 respectively.

As previously explained, bundle 30 is made up of a plurality of film fill sheets I and II which alternate in the bundle, i.e., I-II, I-II, etc. For shipping purposes, the sheets are placed in nested, overlying relationship such that all of sheets I are shingled with respect to sheets II. This is best illustrated in FIGS. 3 and 4, in which it can be seen that each of the sheets II are offset from sheets I to an extent of the width of a respective pattern A and B. When shingled in offset relationship as described, the patterns A and B of sheets I and II are in aligned relationship and will nest in complemental relationship, because surface patterns A are all the same and surface patterns B are all the same. This nested, shingled relationship of the sheets I and II is depicted schematically in FIGS. 4 and 14, and in FIG. 12. Sheet portions with the same pattern nest and stack one on top of the other and fit very close to each other over the entire pattern. The air voids between adjacent sheets I and II of bundles 30 are therefore very minimal, thus assuring that the primary shipping limitation of a plurality of bundles 30 is not volume, but the overall weight of the filled shipping container in which the bundles are transported.

The number of sheets I and II that may be nested to form a unitary bundle 30 is variable and principally depends upon the weight of a bundle 30 that can be effectively handled at the work site. Typically, 2 to 32, and usually 12 to 16 of the sheets I and II may be combined to form a single bundle 30. For example, 16 film fill sheets I and II when spaced center-to-center about 0.75 in expanded form to present a film fill pack, as shown for example in FIG. 15, occupy a space of about 1 ft. in width. The same 16 film fill sheets when nested in accordance with this invention, occupy only about 1¼ in. in space. This is only about ½ in. more than the effective form thickness of one sheet having area-increasing and spacer surfaces as shown, for example, in the '766 patent.

A conventional 6 ft. wide fill pack requires 96 sheets where the effective thickness of each sheet is 0.75 in. Six bundles 30 of nested film fill sheets I and II occupies a transverse volume or thickness of only about 3¾ ins. (0.75 in.+½ in./ft. expanded×6 ft. expanded=3.75 ins.) This is a very substantial reduction in volume.

As shown in FIG. 12, it is desirable that the bundle of sheets I and II be secured and held together by temporary shipping and handling bands or tape 58 or the like which are preferably of material that may be readily cut or be severed by workmen after a bundle 30 has been positioned on support tubes 50 at the site of the fill pack to be formed from the film fill sheets of each bundle 30. If adhesive tape is employed, the tape need only extend across the edges of the bundle.

Surface patterns A and B of sheets I and II are not limited to two pattern regions as pointed out, in that the patterns may be other than essentially straight pattern bands as shown schematically in FIGS. 1–5. The surface configuration of film fill sheets I and II molded in accordance with the teaching of the '766 patent is preferred in part because of the fact that the sheets may be formed by passing a web of synthetic resin film over a suitable vacuum-forming mold in which a movable mold component is moved toward and away from a complemental opposing fixed mold component. Sections of the web are sequentially directed to the molding station with the output again being a web of formed material. By simply choosing the location of cross-severing of the formed web with respect to the surface patterns A and B presented therein, sheets I and II may be provided in which sheet I has the pattern sequence A-B, A-B, A-B, etc., while sheet II has the pattern sequence B-A, B-A, B-A, etc. The essential characteristic is that each individual pattern nests with the same pattern of an adjacent sheet.

A bundle 30 made up of shingled alternating sheets I and II and which are joined together by securing bands 58 may be lifted as a unit to the level of cooling apparatus or a water cooling tower where a fill pack is to be provided. By virtue of the cutout of indentations 38 at the top of rows 40 and 42 defining primary openings 46 in each of the sheets II, and cutout of the indentations 38c of rows 40 and 42 of sheet I, even though sheets I are shingled with respect to sheets II, workmen at the fill level may then pass supporting tubes 50 through all of the primary openings 46 in sheets II, as well as all of the aligned secondary openings 54 in sheets I. The tubes 50 may then be shifted laterally until resting on supporting framework or the like of the cooling apparatus or water cooling tower to provide support for the bundle of sheets.

Next, bands 58 are cut and the workmen may sequentially separate the sheets I and II one from another starting at the side of the bundle 30 furthest away from the upright support side of the cell in which the fill pack is to be installed. Each fill sheet I is moved laterally along the length of supporting tubes 50 a short distance and then simply pulled downwardly whereby the sheet material on each side of respective slits 56 flexes and gives way, allowing the support tubes 50 to pass therethrough until primary openings 46a of sheet I rest on and complementally engage corresponding support tubes 50. It is to be appreciated in this respect that because of the flexibility of the sheet material making up film fill sheets I and II, sequential shifting of the sheets I downwardly into alignment with corresponding sheets II may be accomplished quickly, without a great deal of effort and without the necessity of the workmen paying attention to or being required to determine what the orientation of each sheet I should be with respect to corresponding sheets II.

An indentation 38 in the lower part of one of the rows 40 or 42 of each of the sheets I and II is also desirably cut out to form an opening for receipt of a stabilization tube which extends through all of the aligned, lower openings in the sheets I and II. The stabilization tube is passed through the lower aligned openings in sheets I and II after all of the sheets I have been segregated from bundle 30 and shifted downwardly into the disposition thereof illustrated in FIG. 15.

In the past, when individual film fill sheets have been individually brought up to fill pack level in the cooling apparatus or tower and threaded over support tubes 50 through the uppermost openings, as for example openings 46 of sheet II, the workmen must make certain that each sheet as it is placed on the support tubes is properly oriented with respect to a sheet placed on the support tubes immediately therebefore. Installation of individual sheets was susceptible to improper orientation of the sheets as a result of interruptions of the installation procedure, inattentiveness by the workmen, or as a result of sheets sticking together. When the film fill sheets are out of sequence, adjacent sheets will nest rather than be properly spaced. This essentially wastes a sheet as the two sheets act as one sheet. By packaging the nested sheets into bundles of predetermined sheet count, such as 16 sheets consisting of eight pairs of sheets I and II, the 16 sheets expand to a one foot wide pack segment in which the sheets are nominally spaced 0.75 in. Accordingly, proper installation of the prescribed number of film fill sheets in proper orientation in each fill bank is simplified by the fact that the installers need only count the number of bundles required in the fill bank, e.g., six bundles versus 96 individually-handled film fill sheets.

An added benefit that obtains from the provision of the shingled bundle 30 of alternating sheets I and II is the relative ease of fitting all of the sheets required in a given fill bank. Fill sheets in a bank should fit tightly against the opposed confining structure to prevent vibration of the sheets and to maximize the surface area available for bringing a cooling fluid medium into direct contact with a hot liquid and which is a function of the total number of sheets in a given pack bank area. When sheets are placed individually on fill support tubes such as tubes 50, the last few sheets of the fill bank are very difficult to place properly. These last sheets must be forced into position by pushing and pulling against considerable friction afforded by the side wall of cooling apparatus or tower at the level of the fill pack. In the present instance, a slotted sheet I may be placed next to the confining wall. This outermost sheet may be removed from the bottom tube and rotated slightly such that the interlocking projections 44 are not engaged prior to unnesting of all of the other sheets I and II of the last bundle 30. When the last sheet is in its offset, nested, shingled position, it is somewhat difficult for a workman to pull that last sheet I downwardly into its install position unless the sheet I can travel laterally to a certain extent along the upper support tubes 50. After unnesting of all of the other sheets, this slotted sheet may then be pulled down and rotated into its final position. The bottom tube 50 is then inserted through this last sheet. In order to be able to carry out this installation procedure for the last sheet in the fill pack, it is a requirement that the upper part of the sheet be slotted, as for example, the slits 56, to accommodate rotation of that film sheet.

In the alternate embodiment film fill sheet IA, as illustrated in FIGS. 10 and 11 of the drawings, the principal difference between sheet IA and sheet I is the provision of slots 56a which extend between the uppermost primary opening 46b and the opening 54b immediately therebelow in each of the rows 40b and 42b, respectively. Although it is preferred that the slot between the upper primary opening in each row of indentation cutouts in the film fill sheet and the respective secondary openings therebelow be in the form of a slit such as the slit 56 shown in FIGS. 8 and 9, a wide slot 56a as shown in FIG. 10 or 11 may also be employed. In this instance, each of the slots 56a is of a width approximately equal to the diameter of primary openings 46b and of secondary openings 54b, respectively. In order to provide a degree of reinforcement for sheet material on each side of the relatively wide slots 56a between respective primary openings 46b and secondary openings 54b, the sheet IA is preferably provided with a pair of integral, relatively flat stress distribution and stabilization strips 60 in each row 40b and 42b which extend along the length of each row 40b and 42b along the outermost edges of indicia 38a making up rows 40b and 42b. The integral strips 60 may for example be about ⅛ in. in width. Similar integral strips such as strips 60 may also be provided if desired to stabilize and reinforce the flexible material of film fill sheet I on each side of slits 56 in rows 40 and 42. The strips 60 merge into the semi-circular or circular, integral collars surrounding the opening in the sheets for receiving the tubular supports 50. The collar area also functions to distribute the weight of the sheets and thereby the fill section on the tubular support, which is of value from the standpoint of assuring that the sheets retain their desired shape and integrity under liquid loads thereon at elevated temperatures.

Figure 13:
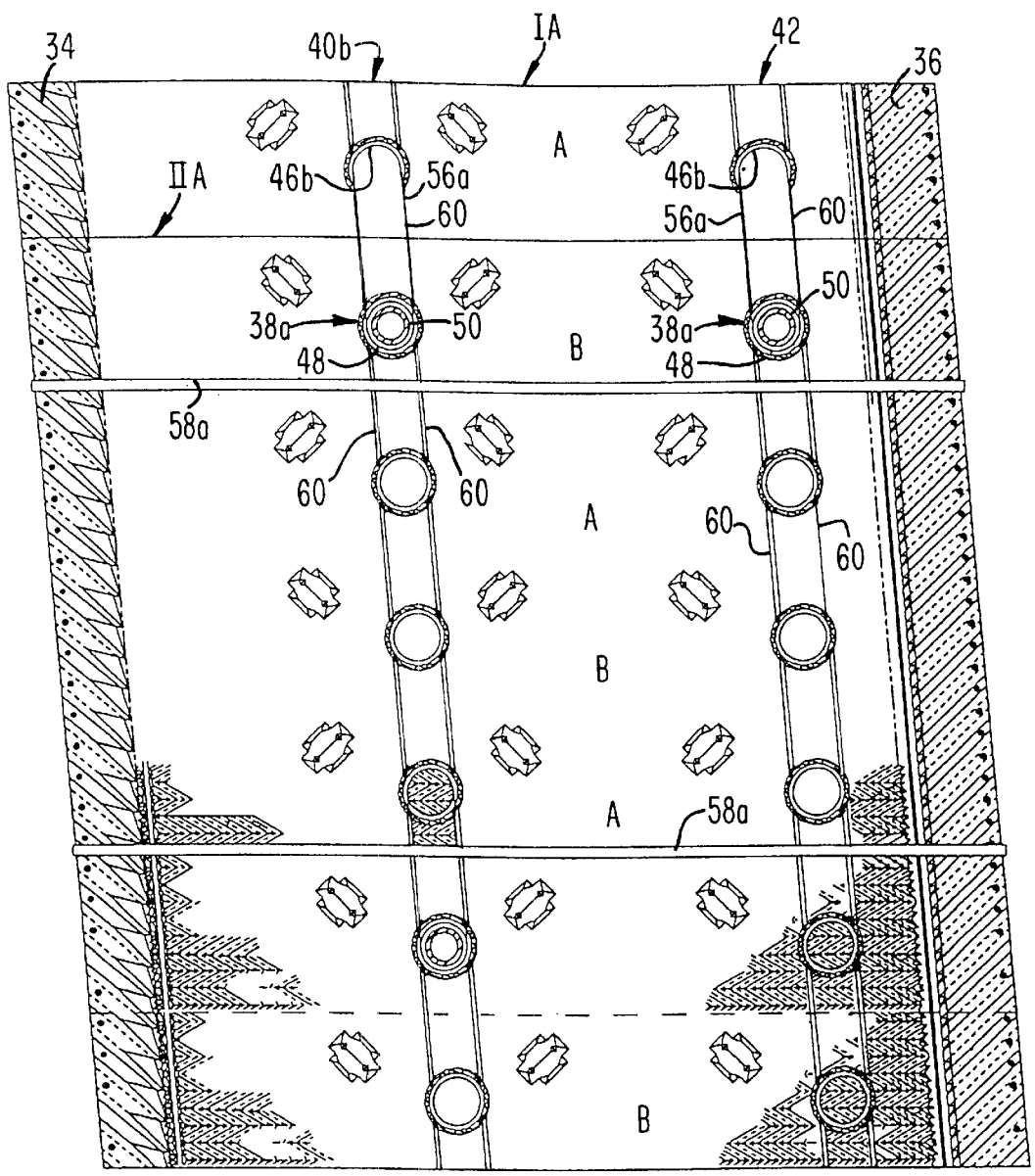
FIG. 13 is a side view of sheets IA and II as depicted in FIGS. 10 and 6, respectively, with sheets IA and II being in shingled relationship as schematically represented in FIG. 4, sheet IA being behind of sheet II, and also shown mounted on support tubes.

The film fill sheets IA, used in association with previously described film fill sheets II, and alternating with the latter, function in the same manner as sheets I, in that the sheets IA, when shingled with respect to sheets II, complementally nest one with respect to the other for shipping purposes, as illustrated in FIG. 13. A bundle made up of nested sheets IA and II and secured by bands 58a may be elevated to the fill pack site in the cooling apparatus or tower in the same manner previously described with respect to the combination of sheets I and II. In like manner, the sheets IA and II may be sequentially separated and the sheets IA moved downwardly until brought into alignment with sheets II. The slots 56a in this respect provide clearance for support tubes 50 as the sheets IA are successively and sequentially pulled downwardly to provide an expanded fill pack 32.

In the alternate film fill sheet IC and IIC embodiment of the invention as illustrated in FIGS. 16 and 17, it is to be observed that the film sheets IC and IIC have vertically-oriented surface area-increasing patterns A and B as contrasted with the horizontal patterns A and B of the preceding embodiments. Thus, film fill sheet IC has patterns from left to right of A-B, AB, A-B, A-B and A, while film fill sheet IIC has from left to right, surface increasing patterns B-A, B-A, B-A, B-A and B. Each of the patterns A will nest complementally, and the same is true as each to the patterns B.

It can be seen from FIG. 16 that the pattern A-1 inboard from the left margin of film fill sheet IIC is provided with a primary opening 46c. Another primary opening 46c is provided in the pattern B-1 inboard from the right margin of the sheet IIC. The sheet IC is provided with a primary opening 46d in the pattern B-2, and a secondary opening 54c in the pattern A-2 and which are interconnected by a slot or slit 56c. Similarly, pattern B-3 of sheet IC is provided with a primary opening 46d, while a secondary opening 54d is provided in outboard pattern A-3 of the sheet. A slot 56c also interconnects the primary opening 46d and the secondary opening 54d in the patterns B3 and A3, respectively. When the film fill sheets IC and IIC are placed in overlying, shingled relationship as illustrated in FIG. 16, the primary openings 46c in film fill sheet IIC aligned with the secondary openings 54d in film sheet IC. The sheets IC and IIC will complementally nest in shingled relationship when the sheets IC and IIC are offset as shown in FIG. 16 to form a shingled bundle thereof of minimum thickness. The alternate sheets IC and IIC making up a bundle thereof may be mounted in a tower to form a fill pack in a manner as previously described except in this instance, unshingling of the sheets IC with respect to alternate film fill sheets IIC takes place essentially horizontally rather than generally vertically. Tubular supports such as the tubes 50 previously described are used to support shingled bundle as alternate sheets IC are sequentially and successively shifted horizontally into alignment with sheets IIC. The shingled relationship of sheets IC and IIC is shown schematically in FIG. 17. Thus moving sheets IC and IIC out of their shipping, nested relationship results in an unshingled, unnested bundle thereof as illustrated schematically in FIG. 18.

Figure 19:
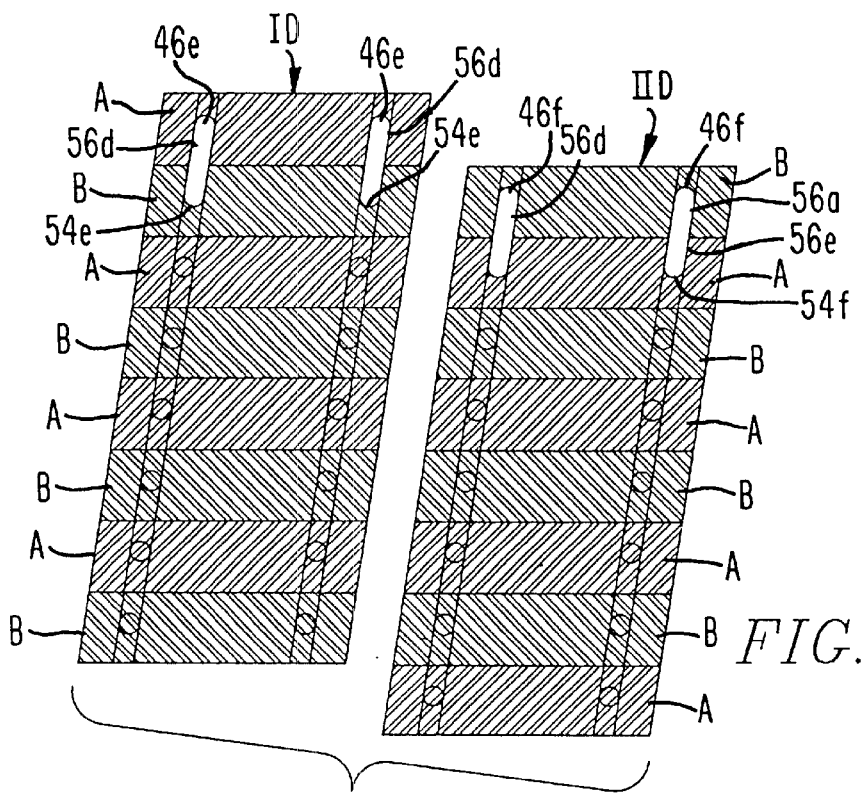
FIG. 19 is a schematic representation of a further alternative embodiment of the invention in which both sheets ID and IID are provided with elongated support-receiving slots or slits.
Figure 20:
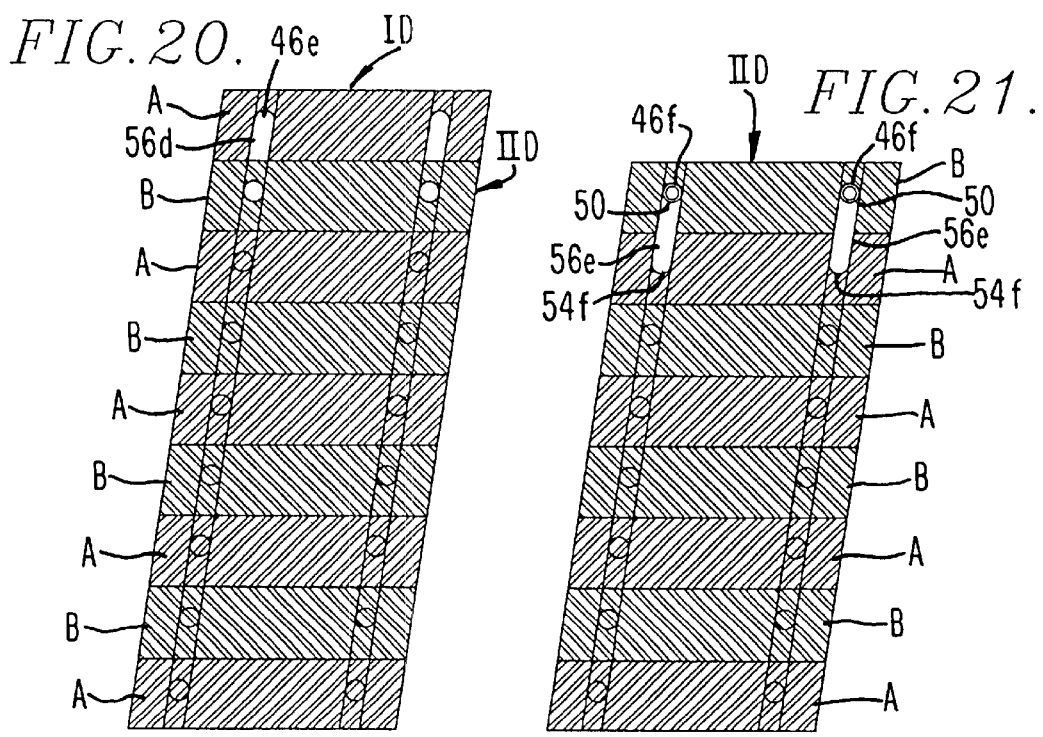
FIG. 20 is a schematic representation of the embodiment of the invention shown in FIG. 19 and illustrating sheets ID and IID in shingled relationship similar to the schematic representation of FIG. 4, with sheet IID in this instance being depicted in front of sheet ID.
Figure 21:
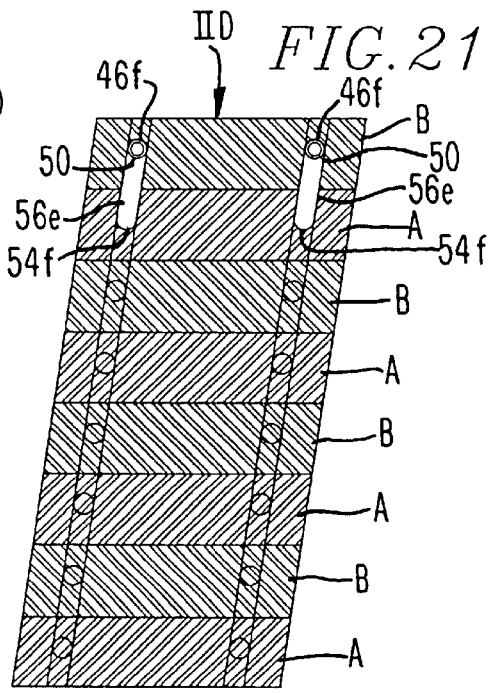
FIG. 21 is a schematic representation of the embodiment of the invention shown in FIG. 19 and illustrating sheets ID and IID after unshingling thereof similar to the schematic representation of FIG. 5 in that sheet IID is in front of sheet ID.

In the ID and IID film fill sheet embodiment of the invention as shown in FIGS. 19–21, sheets ID and IID are each provided with elongated slots which interconnect the primary support tube-receiving openings and the secondary tube-receiving openings in respective sheets. Viewing FIG. 19, it is to be seen that sheet ID has alternating surface area-increasing patterns A-B, A-B, A-B, A-B, while sheet IID has alternating surface area-increasing patterns B-A, B-A, B-A, B-A. Support tube-receiving openings 46e in pattern A of sheet ID, and secondary support tube-receiving openings 54e in adjacent pattern B of the sheet, are each joined by a respective slot 56d. Again, although slot 56d is illustrated schematically as being of the same width as the diameter of openings 46e and 54e, it is to be understood the representation in FIG. 19 is for illustrative purposes only and the slots may be and preferably are in the form of slits as previously described with respect to film fill sheets I and II.

In like manner, film fill sheet IID has primary support tube-receiving openings 46f in pattern B at the uppermost end of the film fill sheet IID, as well as secondary support-tube receiving openings 54f in the surface area-increasing pattern A next adjacent thereto. Slots or slits 56e interconnect respective primary openings 46f and secondary openings 54f in the film fill sheet IID. When sheets ID and IID are offset in shingled relationship as shown in FIG. 20, the pattern areas in A and B thereof complementally nest, thus permitting formation of a nested bundle thereof as previously described with respect to the other embodiments of the film fill sheets.

Installation of a bundle of film fill sheets made up of alternating sheets ID and IID in liquid cooling apparatus or a water cooling tower to provide a film fill pack is carried out in the same way as described earlier with respect to bundle 30. The slots or slits 56d in film fill sheets ID provide clearance for the support tubes such as tubes 50 as the bundle of sheets is unshingled as film fill sheets ID are successively and sequentially shifted downwardly to bring all of the sheets into alignment as illustrated schematically in FIG. 21.

Figure 22:
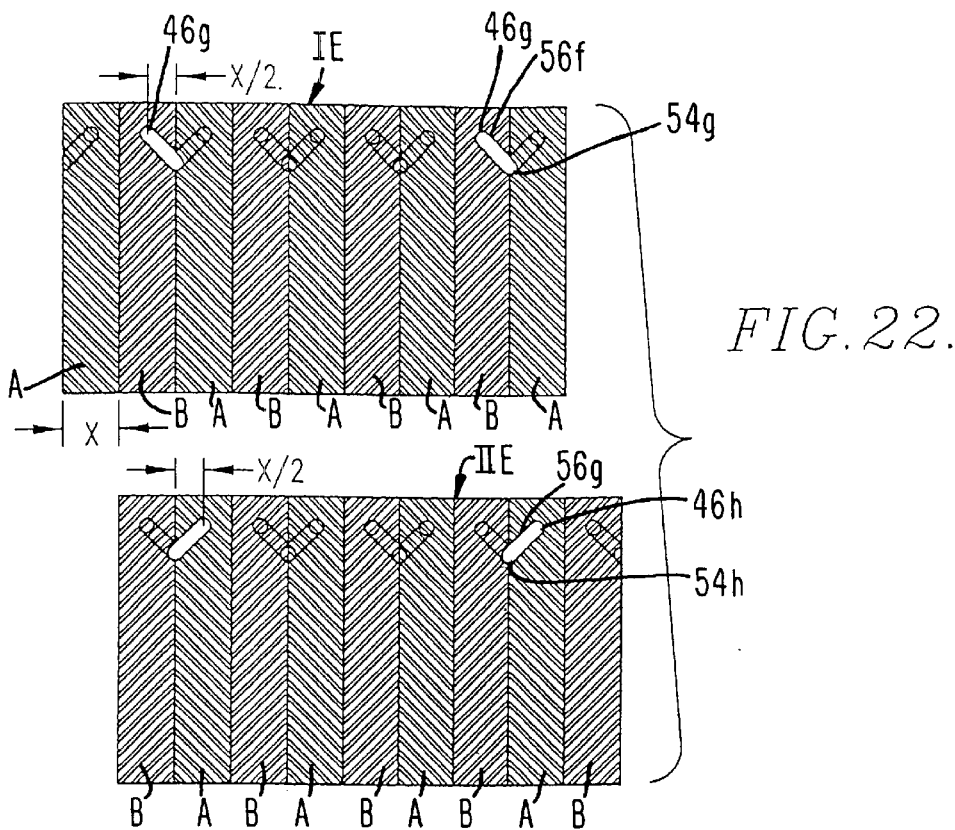
FIG. 22 is a schematic representation of a still further embodiment of the invention in which the film fill sheets IE and IIE have horizontally repetitive fill patterns A-B, A-B, etc. and B-A, B-A, etc., in which the surface area-increasing patterns are shown as being of corrugated configuration.

The film fill sheets IE and IIE illustrated in FIGS. 22 have an alternate inclined slot arrangement for receiving and clearing each support tube or other structural support for the bundle of film fill sheets. It is to be observed from FIG. 22 that an angular slot or slit 56f extends between and intercommunicates the upper opening 46g with the secondary opening 54g of film fill sheet IE. An angular slot or slit 56g in film fill sheet IIE of FIG. 22 extends between and intercommunicates with opening 46h and associated opening 54h in that sheet.

It is to be observed from FIG. 22, that the opening 46g of each slot 56f of sheet IE, and each opening of 46h of each slot 56g of sheet IIE are located equidistantly from the side margins of corresponding end board patterns B of sheet IE, and end board patterns A of sheet IIE, respectively. Thus, if the width of each pattern is equal to a distance X, the spacing of the upper end of each of the slots 56f and 56g from respective side margins of patterns A and B is equal to X/2, as indicated in FIG. 22.

Figure 23:
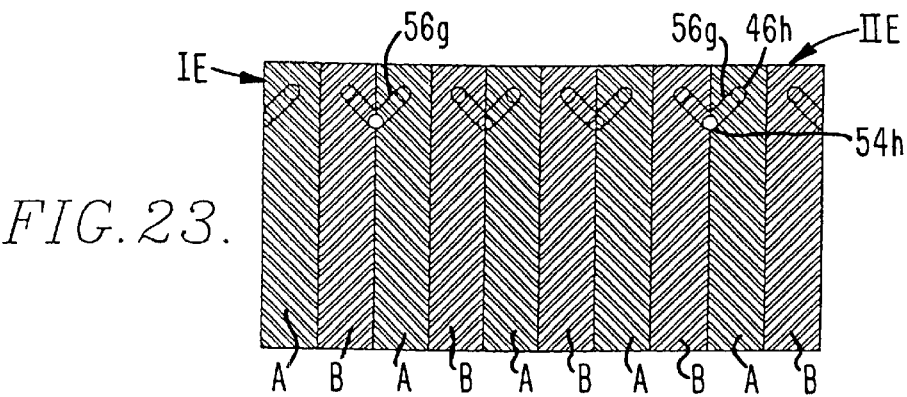
FIG. 23 is a schematic representation of film fill sheets IE and IIE in overlying, nested, shingled relationship, with the fill sheet IE extending outwardly to the left of sheet IIE.

The slots or slits 56f and 56g in film fill sheets IE and IIE, respectively, are strategically located such that when sheet IE is in offset shingled relationship with respect to film fill sheet IIE, as shown in FIG. 23, and the bundle of sheets has been raised to the elevation of the fill in the tower cooling apparatus, the support structure 50c for the bundle will be located in the opening defined at the bottom apex of slots 56f and 56g defined by openings 54g and 54h, respectively, as illustrated in FIG. 25.

Figure 24:
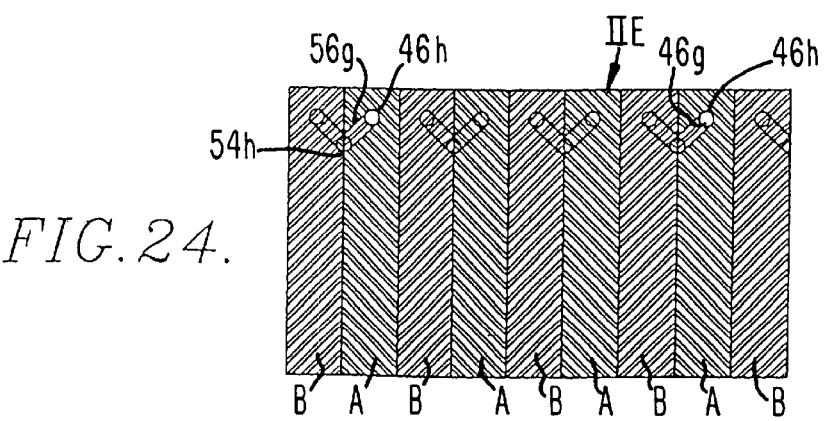
FIG. 24 is a schematic representation of film fill sheets IE and IIE in overlying, unnested, unshingled relationship.

After installation of the nested and shingled bundle of sheets IE and IIE as shown in FIG. 24, on spaced support structures 50c of the tower or cooling apparatus, the sheets IE and IIE are then successively and sequentially shifted relatively to unshingle and unnest the bundle. This is accomplished by shifting each of the sheets downwardly and laterally of the sheet there next behind. In the case of sheet IE, the slots 56f provide clearance for respective support structures 50c which then move into the upper ends of slots 46g as shown in FIG. 26. The same is true with respect to the shifting of IIE, except in this instance, the sheet IIE being shifted moves downwardly and laterally in a direction opposite the movement of sheet IE. The slots 56g provide clearance for the support structures 50c as the sheet IIE is shifted downward and laterally. By virtue of the fact that the upper ends of slots 56f and 56g, respectively, are located midway of respective surface area-increasing patterns A and B as described, downward and lateral movement of each sheet a distance equal to one-half of the width of a respective pattern results in the total displacement of the sheets relatively to be a distance equal to the width of corresponding patterns A and B.

Thus, when adjacent film fill sheets IE and IIE are pulled downwardly and laterally, the support structures 50c will then be located in engagement with the openings 46g and 46h at the upper ends of slots 56f and 56g, as shown in FIG. 26. Shifting of adjacent film fill sheets IE and IIE relatively expands those sheets and results in unnesting of the fill patterns A and B to provide fluid and liquid passages between adjacent film sheets.

FIGS. 27 and 28 depict another embodiment of the invention in which the horizontal slots or slits of film fill sheets IC and IIC are replaced by generally L-shaped slots or slits 56j. Viewing FIG. 27, it is to be observed that the film fill sheet IF which in that Figure is offset with respect to the film fill sheet IIF in order to permit overlying surface area-increasing patterns to nest, is provided with a secondary opening 46i and a primary opening 54i that are joined by the L-shaped slot or slit 56j. On the other hand, the film fill sheet IIF has an elongated, upright opening 46j which aligns with opening 46i in film fill sheet IF when sheets IF and IIF are offset as depicted in FIG. 27. In the shingled dispositions of film fill sheets IF and IIF of FIG. 27, the sheets complementally nest permitting a bundle thereof to be installed in liquid cooling apparatus or a water cooling tower in the manner previously described with respect to sheets IC and IIC. However, in this case, when the sheet IF is shifted horizontally into overlapping aligned relationship with film fill sheet IIF, the support member 50e associated with each slot 56j moves into the offset opening 54i at the end of a respective slot or slit 56j to lock the film fill sheets together. In order to accommodate that locking action, the sheets IIF also move downward to a limited extent as the support tube 50e is received in the upper end of a corresponding opening 46j in film fill sheet IIF.

Figure 29:
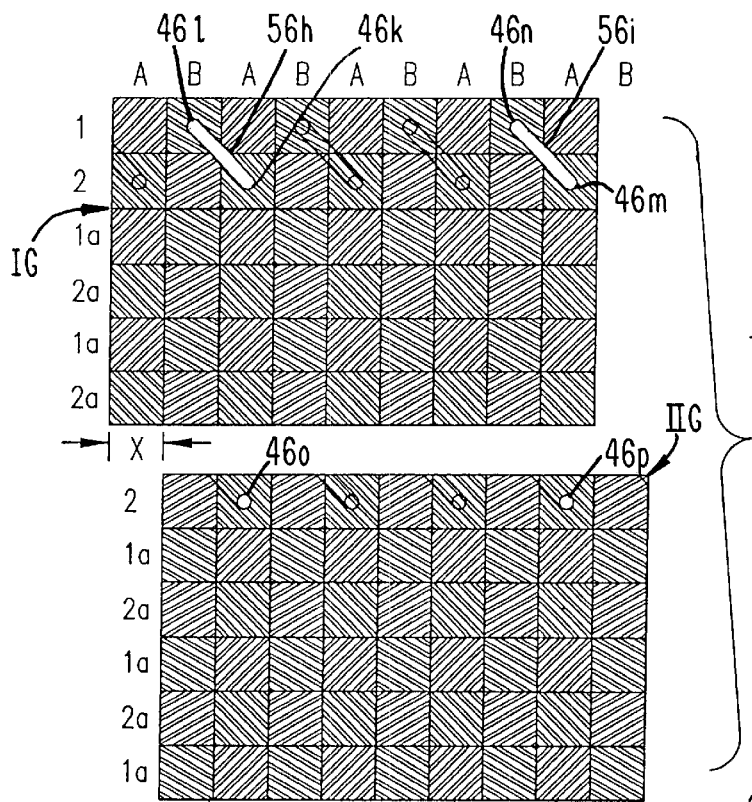
FIG. 29 is a schematic representation of a further embodiment of the invention and illustrating fill sheets IG and IIG respectively, each of which has a checkerboard arrangement of corrugated surface area-increasing patterns represented as vertical columns A-B, A-B, etc. and horizontal rows 1, 2, 1a, 2a, etc., respectively.
Figure 30:
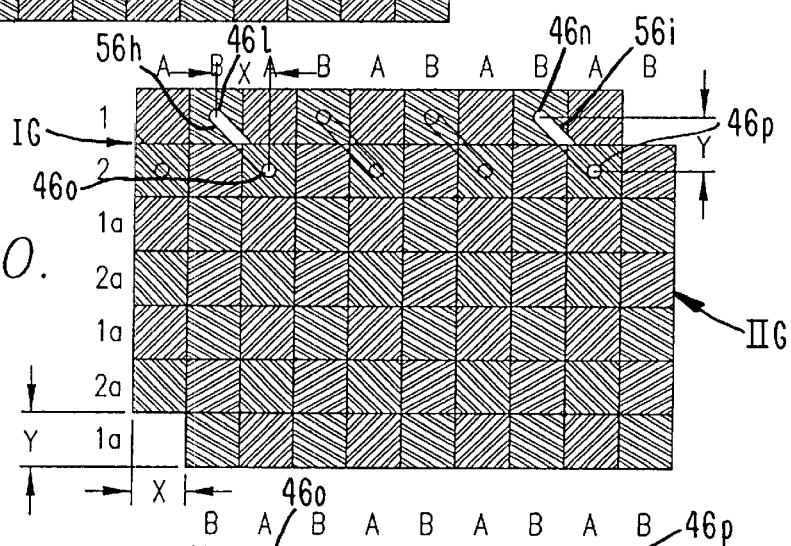
FIG. 30 is a schematic representation of the film fill sheets IG and IIG in overlying, nested, shingled relationship, with sheet IIG being positioned one pattern column to the right and one pattern row down from the patterns of film fill sheet IG.
Figure 31:
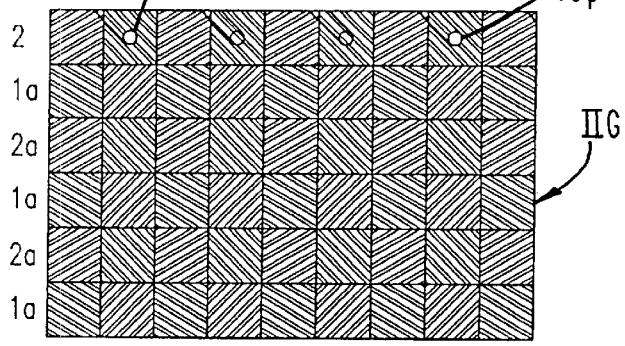
FIG. 31 is a schematic representation of the film fill sheets IG and IIG in overlying, unnested, and unshingled relationship.

The film fill sheets IG and IIG of the embodiment of the invention shown schematically in FIGS. 29 through 31 inclusive, have checkerboard surface area-increasing patterns. Sheet IG, for example, may be provided with alternate upright columns A-B, A-B, etc. and alternate horizontal rows 1-2, 1a-2a, etc. which comprise a series of side-by-side blocks of four patterns. For example, in the upper left-hand corner of sheet IG in FIG. 29, one four-block pattern comprises the pattern A1, B1, A2, and B2. Similarly, a four-block pattern therebelow comprises blocks A1a, B2a, A2a, and B2a. Likewise, film fill sheet IG has four-block patterns similar to those previously described with film fill sheet IG, except in this instance, the four-block pattern in the upper left-hand corner of sheet IIG comprises block patterns B2, A2, B1a and A1a. In order for the film fill sheets IG and IIG to nest overall when in shingled relationship, the surface area-increasing pattern blocks are oriented and configured such that all block patterns nest when sheet IIG is offset with respect to sheet IG by one column and one row of blocks. Thus, as is apparent from FIG. 30, when the sheets IG and IIG are vertically and laterally offset by one column and one row, the blocks B2, A2, B1a, and A1a of sheet IIG complementally nests with similar blocks B2, A2, B1a and A1a of sheet IG located one row and one column removed from the upper left-hand corner of sheet IG.

Each of the film fill sheets IG has a pair of elongated slots 56h and 56i, respectively. The slot 56h is terminated by a central lower opening 46k in block A2, and by an upper opening 46l which is terminated centrally by block B1. The slot 56i, on the other hand, is terminated by a lower central opening 46m in block A2, and by an upper central opening 46n in block B1. Film fill sheet IIG on the other hand is provide with a central opening 46o in block A2, and a second opening 46p in block A2 of the right-hand column A.

When film fill sheets IIG are shingled with film fill sheets IG by one vertical column and one horiztonal row, as shown in FIG. 30, the openings 46o and 46p of sheet IG align with the terminal openings 46k and 46m respectively with slots 56h and 56i in sheet IG. In this manner, a bundle of shingled sheets IG and IIG may be raised to the elevation of the fill and support structure such as support tubes 50 may be inserted through the line openings for supporting the bundle.

Next, the bundle is expanded by successively and sequentially moving for example each of the sheets IG downwardly and laterally with respect to film fill sheets IIG to bring all of the sheets into unshingled and unnested, expanded relationship as shown in FIG. 31, wherein the support tubes 50 now rest in the terminal openings 46l and 46n of all of the sheets IG. Tubes 50 within openings 46o and 46p of all of the film fill sheets IIG continue the support of those sheets of the expanded bundle.

It is to be observed that the film fill sheets IG and IIG differ from film fill sheets I and II principally in the orientation of the surface area-increasing patterns of the sheets. By locating the boundaries of the surface area-increasing patterns corrugations as illustrated by the blocks of film fill sheets IG and IIG, in generally perpendicular relationship to the longitudinal extent of slots 46o and 46p, the orientation of the fill patterns thereby represented are similar to the boundaries of the surface area-increasing patterns of film fill sheets I and II which are also essentially perpendicular to the slots 56 of sheets I and II.

It is to be appreciated that with respect to embodiments illustrated in FIGS. 25–28 inclusive, that only one support tube or member 50 is shown for the sake of simplicity but, in fact, there would be two or more support members or structures and associated slots and openings in the film fill sheets as described with the other embodiments of this invention.

FIG. 32 is an illustration of alternate support structure 50a for each bundle of nested film fill sheets, as well as the expanded fill pack section formed therefrom, and may serve as a replacement for the support tubes 50. In this instance, the primary openings in the film fill sheets which are not shifted in the sheet expansion process, are configured to at least receive the transversely wider support structure 50a. The same is true as to the lower corresponding secondary openings 54 where slits 56 are provided rather than wider slots. The support structure 50b illustrated in FIG. 33 is similar to the support structure of FIG. 32 except that the upper edge of the support is defined by angular trapezoidal surfaces, as opposed to the semi-circular upper surface of support 50a. In both instances, support 50a and 50b may be conveniently constructed of conventionally available materials such as common wood 2×4's or 2×6's.

Although the film fill sheets illustrated schematically in FIGS. 1–5 and 16–33 depict corrugated fill patterns for simplicity, it is to be appreciated that various fill patterns may be employed, including the specific patterns of FIGS. 6–13, without departing from the scope of this inveniton.

In certain uses of film fill packs formed from bundles 30, the lower edges of the fill presented by the film fill sheets may be staggered either with adjacent sheets being vertically offset, or with only certain of the bottom edges thereof being staggered to prevent bridging of water across the lowermost fluid flow delivery openings in heavy water loading applications.

If the cooling apparatus involves liquids to be cooled which are hotter than can be accommodated by a synthetic resin film such as PVC film previously described, other materials can be used for fabrication of the fill sheets, including high temperature resistant plastics or metals such as stainless steel.

Although the preferred embodiment of this invention employs narrow slits 56 or the alternative, relatively wide slots between lower secondary opening and the upper primary opening in each row thereof as described, it is within the scope of the invention to provide lines of weakness between the openings that perform in essentially the same manner as slits or slots. Therefore, as used herein, "slot" or "slit" is also intended to mean a line or lines of weakness in the material which is not necessarily cut all the way through the sheet. In both instances, a slit or slot or a line of weakness formed in the sheet material will allow the support rod to pass therethrough without offering untoward resistance to the support rod, or cause the material from which the fill sheet is made or formed to tear or inadvertently permanently deform.

We claim:

1. A bundle of liquid film fill sheets which nest and may be expanded to form all or part of a film fill pack mounted on supporting structure, said bundle comprising:

a plurality of nested film fill sheets, each having area-increasing surface patterns on opposite faces thereof, the surface patterns of the sheets being configured for complemental nesting of adjacent overlying sheets, at least certain of said sheets being offset with respect to the other sheets to present a nested, shingled fill sheet bundle, each of said sheets having a primary opening therein for receipt of the supporting structure for the film fill pack, said certain sheets of the bundle having secondary openings for receipt of the supporting structure therein such that when the sheets are in said shingled, nested relationship, the secondary openings of said certain other sheets align with the primary openings of the remaining sheets of the bundle, and there being slots in said certain sheets of the bundle communicating the secondary openings of said certain sheets with the primary openings therein for clearing said support structure for the sheets, the nested bundle being expandable to form a film fill pack with liquid and coolant fluid passages being presented between adjacent sheets by unshingling of said certain sheets while the bundle is supported on said supporting structure as the slots in said certain sheets clear the supporting structure during unshingling of said certain sheets, wherein each of said film sheets is of flexible material and each of the slots in said certain sheets have a first circular aperture having a first diameter, a second circular aperture having a second diameter, and an elongated, relatively narrow slit having a width less than the first diameter and less than the second diameter, so that the slots permit the support structure to pass therethrough as the film material flexes during unshingling of said certain sheets of the bundle.

2. A bundle of shingled, nested, expandable film fill sheets as set forth in claim 1, wherein said sheets are each provided with integral segments surrounding at least a portion of each of the openings and serving as a reinforcement for the latter.

3. A bundle of shingled, nested, expandable film fill sheets as set forth in claim 1, wherein each of said slots in said certain sheets is of a width generally equal to the effective width of the supporting structure for the film pack.

4. A bundle of shingled, nested, expandable film fill sheets as set forth in claim 3, wherein said sheets are each provided with integral segments surrounding at least a portion of each of the openings and along the length of opposite sides of the slots and serving as a reinforcement for respective openings and slots.

5. A bundle of shingled, nested, expandable liquid film fill sheet as set forth in claim 1, wherein each of said sheets is provided with at least two surface pattern sections, said surface pattern sections being oriented in each sheet in disposition such that two adjacent film sheets complementally nest, one with respect to the other, when adjacent sheets are located in said offset shingled relative relationship, and are non-complemental when said certain sheets are unshingled with respect to the remaining sheets.

6. A bundle of shingled, nested, expandable film fill sheets as set forth in claim 5, wherein each of the surface pattern sections of each of the film fill sheets is provided with indicia representative of an opening location therein, with the primary openings being formed in respective sheets at selected indicia, and the secondary openings being formed in said certain sheets at indicia offset from the primary openings by a distance equal to the extent to which the said certain sheets are moved with respect to the remaining sheets during unshingling of said certain sheets.

7. A bundle of shingled, nested, expandable film fill sheets as set forth in claim 1, wherein each of the sheets is provided with a stabilization opening in spaced relationship from said primary openings, said stabilization openings being located to receive a stabilizing member extending through all of the film sheets after expansion of the bundle of film sheets by unshingling of said certain sheets.

8. A bundle of shingled, nested, expandable film fill sheets as set forth in claim 1, wherein said liquid film fill sheets are configured for use in liquid cooling apparatus and each include integral, V-shaped surfaces defining a chevron pattern with the apex of each V surface extending in a direction generally transverse to flow of liquid over the sheet.

9. A bundle of shingled, nested, expandable film fill sheets as set forth in claim 8, wherein each of said liquid film fill sheets include integral surfaces defining inlet louvers on one margin of each sheet and eliminator louvers on an opposite margin of each sheet.

10. A bundle of shingled, nested, expandable film fill sheets as set forth in claim 8, wherein each of said liquid film fill sheets include integral surfaces defining spacers which complementally nest when said certain sheets are in shingled relationship, but interengage and hold the sheets in predetermined, spaced relationship presenting said liquid and coolant fluid passages between adjacent sheets upon unshingling of said certain sheets.

11. A bundle of shingled, nested, expandable film fill sheets as set forth in claim 1, wherein said certain sheets and the remaining sheets are each provided with undulated surfaces defining said area-increasing patterns, the undulating surfaces in said certain sheets extending in a first direction of a respective sheet, and the undulating surfaces of the remaining sheets extending in a second direction at an angle with respect to said first direction, said undulating surfaces of adjacent sheets nesting when the sheets are in shingled relationship presenting said bundle, and being out of nesting orientation upon unshingling of said certain sheets to present a cross-corrugated film fill pack.

12. A bundle of shingled, nested, expandable film fill sheets as set forth in claim 1, wherein said surface area is configured to increase the flow rate time of liquid directed over the surface pattern along one direction of said sheets of an expanded pack thereof.

13. A bundle of shingled, nested, expandable film fill sheets as set forth in claim 12, wherein the slots in the said certain sheets are oriented generally in the direction of flow of liquid over the sheets of an expanded pack thereof.

14. A bundle of shingled, nested, expandable film fill sheets as set forth in claim 11, wherein the margins of the film fill sheets which are adjacent the supporting structure upon mounting of the bundle on the supporting structure are generally aligned upon unshingling of said certain sheets.

15. A bundle of liquid film fill sheets which nest and may be expanded to form all or part of a film fill pack mounted on supporting structure, said bundle comprising:

a plurality of nested film fill sheets, each having area-increasing surface patterns on opposite faces thereof, the surface patterns of the sheets being configured for complemental nesting of adjacent overlying sheets, at least certain of said sheets being offset with respect to the other sheets to present a nested, shingled fill sheet bundle, each of said sheets having a primary opening therein for receipt of the supporting structure for the film fill pack, said certain sheets of the bundle having secondary openings for receipt of the supporting structure therein such that when the sheets are in said shingled, nested relationship, the secondary openings of said certain other sheets align with the primary openings of the remaining sheets of the bundle, and there being slots in said certain sheets of the bundle communicating the secondary openings of said certain sheets with the primary openings therein for clearing said support structure for the sheets, the nested bundle being expandable to form a film fill pack with liquid and coolant fluid passages being presented between adjacent sheets by unshingling of said certain sheets while the bundle is supported on said supporting structure as the slots in said certain sheets clear the supporting structure during unshingling of said certain sheets, wherein each of the sheets is provided with a stabilization opening in spaced relationship from said primary openings, said stabilization openings being located to receive a stabilizing member extending through all of the film sheets after expansion of the bundle of film sheets by unshingling of said certain sheets.

16. A liquid film fill sheet comprising:

a first aperture sized to receive a supporting structure, said first aperture having a first width;

a second aperture sized to receive the supporting structure, said second aperture having a second width; and a slit that extends between and connects said first aperture and said second aperture wherein said slit has a width less than the first width and less than the second width.

17. The liquid film fill sheet according to claim 16, wherein the first aperture is circular and the first width is a diameter and the second aperture is circular and the second width is a diameter, and wherein the diameters are equal.

18. The liquid film fill sheet according to claim 16, further comprising area-increasing surface patterns on opposite faces thereof.

19. The liquid film fill sheet according to claim 16, wherein said slit is defined by regions that are deformable and resilient.

20. A liquid film fill sheet comprising:

a first aperture sized to receive a supporting structure, said first aperture having a first width;

a second aperture sized to receive the supporting structure, said second aperture having a second width;

a third aperture sized to receive a stabilizing member; and a slit that extends between and connects said first aperture and said second aperture wherein said slit has a width less than the first width and less than the second width.

21. The liquid film fill sheet according to claim 20, wherein the first aperture is circular and the first width is a diameter and the second aperture is circular and the second width is a diameter, wherein the diameters are equal.

22. The liquid film fill sheet according to claim 20, further comprising area-increasing surface patterns on opposite faces thereof.

23. The liquid film fill sheet according to claim 20, wherein said slit is defined by regions that are deformable and resilient.

* * * * *